(12) United States Patent
Li et al.

(10) Patent No.: US 11,750,376 B2
(45) Date of Patent: *Sep. 5, 2023

(54) THRESHOLD SCHEME ENABLED SYMMETRIC KEY MEMBER DELETION

(71) Applicant: The Boeing Company, Houston, TX (US)

(72) Inventors: Mingyan Li, Bellevue, WA (US); Douglas A. Stuart, St. Charles, MO (US); Jai J. Choi, Sammamish, WA (US); Joshua D. Cazalas, Madison, AL (US)

(73) Assignee: The Boeing Company, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/826,137

(22) Filed: May 26, 2022

(65) Prior Publication Data

US 2022/0286276 A1    Sep. 8, 2022

Related U.S. Application Data

(62) Division of application No. 16/875,915, filed on May 15, 2020, now Pat. No. 11,374,744.

(51) Int. Cl.
*H04L 9/08* (2006.01)
*H04L 9/40* (2022.01)

(52) U.S. Cl.
CPC ............ *H04L 9/085* (2013.01); *H04L 9/0894* (2013.01); *H04L 63/0435* (2013.01)

(58) Field of Classification Search
CPC .... H04L 9/085; H04L 9/0894; H04L 63/0435
See application file for complete search history.

(56) References Cited

U.S. PATENT DOCUMENTS

| | | | |
|---|---|---|---|
| 2019/0079789 A1* | 3/2019 | Mahkonen | H04L 63/162 |
| 2020/0137082 A1* | 4/2020 | Jimenez-Delgado | H04L 9/3239 |
| 2020/0210070 A1* | 7/2020 | Durham | G06F 21/73 |

(Continued)

OTHER PUBLICATIONS

Harney H. and Muckenhirn C.,"Group key management protocol (GKMP) architecture", RFC 2094, Jul. 1, 1997, 22 pages.

(Continued)

*Primary Examiner* — Ashokkumar B Patel
*Assistant Examiner* — William B Jones
(74) *Attorney, Agent, or Firm* — FERGUSON BRASWELL FRASER KUBASTA PC

(57) ABSTRACT

A method of securing, by a managing node, communication in a network of member nodes including a first member node. Communication is secured using a (k, $n_1$) secret sharing scheme during a first phase. The managing node announces a phase shift to a subsequent phase relative to the first phase. The managing node secures communication in the network during the subsequent phase using a (k+x, $n_2$) secret sharing scheme. Each of the member nodes is previously in possession of exactly one corresponding unique share for the second key. The first member node is previously in possession of a first unique share for the second key. The managing node deletes the first member node from the subsequent phase by broadcasting the first unique share for the second key.

20 Claims, 9 Drawing Sheets

(56) References Cited

U.S. PATENT DOCUMENTS

2020/0348662 A1* 11/2020 Cella ................. G05B 23/0286

OTHER PUBLICATIONS

Wong C.K., Gouda M., Lam S., "Secure group communications using key graphs", IEEE/ACM Trans. Netw. 8 (1) Feb. 1, 2000, 15 pages.
Shamir, Adi, "How to share a secret", Communications of the ACM, 22, Jan. 1, 1979, 2 pages.
Blakley B., Blakley G.R., Chan A.H., Massey J.L., "Threshold schemes with disenrollment", In: Brickell E.F. (eds) Advances in Cryptology CRYPTO 92. CRYPTO, Lecture Notes in Computer Science, vol. 740. Springer, Berlin, Heidelberg, Jan. 1, 1993, 9 pages.
Li, M.and Poovendran R. "Disenrollment with perfect forward secrecy in threshold schemes", IEEE Trans. on Information Theory, 52(4):1676-1682, Apr. 1, 2006, 7 pages.
Harn L. and Lin, C., "Authenticated group key transfer protocol based on secret sharing", IEEE Trans. on Computers, 59(6): 842-846, Jun. 1, 2010, 5 pages.
Abdallah W., Boudriga N., Kim D., and An S., "An efficient and scalable key management mechanism for wireless sensor networks", IEEE Advanced Communications Technology Conferences, 3(4):687-692, Jul. 2014, 14 pages.

* cited by examiner

PICTORIAL OVERVIEW OF MULTI-PHASE INCREMENTAL THRESHOLD SECRET SHARING SCHEME WITH MEMBER NODE DELETION

*Concept 1*: Initially define keys and shares for the keys: One key per phase, one share per node.
    Phase 1: $k^1$, for which a set of shares is defined: [{A}, {B}, {C}, {D}, {E}]
    Phase 2: $k^2$, for which a set of shares is defined: [{F}, {G}, {H}, {I}, {J}]

*Concept 2*: Distribute shares to the member nodes in an initial share vector distribution, as shown.

|  | Node 1 | Node 2 | Node 3 | Node 4 | Node 5 |
|---|---|---|---|---|---|
| Phase 1 Shares: | {A} | {B} | {C} | {D} | {E} |
| Phase 2 Shares: | {F} | {G} | {H} | {I} | {J} |

*Concept 3*: Summary of the results of Concept 2, from the perspective of the member nodes.
    Node 1: {A} (for phase 1) {F} (for phase 2)
    Node 2: {B} (for phase 1) {G} (for phase 2)
    Node 3: {C} (for phase 1) {H} (for phase 2)
    Node 4: {D} (for phase 1) {I} (for phase 2)
    Node 5: {E} (for phase 1) {J} (for phase 2)

*Concept 4*: Managing node uses a $(k, n)$ incremented threshold secret sharing scheme to secure communication, where each phase increments the threshold by at least 1.
    Phase 1: (1, 5) threshold scheme
    Phase 2: (2, 5) threshold scheme

*Concept 5*: Phase 1 network operations. Each node has one share. In Phase 1 a (1, 5) threshold scheme is in effect. Because, in Phase 1, only 1 share is needed to reconstruct the key, every node can resolve the key and is a member of the network.

*Concept 6*: Node 1 is to be deleted from the network. The network announces a phase shift command to phase 2 and broadcasts the phase 2 share for the to-be-deleted Node 1 (*i.e.*, {F}).

*Concept 7*: Due to the broadcast of the Phase 2 share for to-be-deleted Node 1, each node now has the following shares for the secret key pre-determined for use during Phase 2:

| Node 1 | Node 2 | Node 3 | Node 4 | Node 5 |
|---|---|---|---|---|
| {F},{F} | {F},{G} | {F},{H} | {F},{I} | {F},{J} |

*Concept 8*: Node 1 has a duplicate share: {F}, one copy of {F} because it was pre-assigned at concept 4, and another copy of {F} because it was broadcast by the managing node at concept 6.

*Concept 9*: In Phase 2 the threshold is incremented by 1, so that now the (2, 5) threshold scheme applies; thus, in Phase 2, two valid shares are needed for a node to reconstruct the key for phase 2 (*i.e.*, $k^2$). Node 1 only has ONE share (*i.e.*, {F}). Thus, Node 1 cannot join the network, as it needed two shares. The remaining nodes have TWO shares - the one share broadcast for Node 1 and the one previously secretly assigned at concept 4. Thus, all remaining nodes remain in the network.

FIG. 2A

THRESHOLD SCHEME ENABLED SYMMETRIC KEY MEMBER DELETION

RELATED APPLICATIONS

This application is a divisional application of U.S. patent application Ser. No. 16/875,915, filed May 15, 2020, now U.S. Pat. No. 11,374,744, the entirety of which is hereby incorporated by reference.

FIELD

The one or more embodiments relate to network security.

BACKGROUND

Networks of devices are ubiquitous in the modern economy. For example, routers may be connected to each other to establish a communication network. In another example, network hardware may be placed on or within objects for tracking and/or control purposes, such as an "Internet of Things" (IoT) network. In another example, mobile communication devices, including but not limited to mobile phones, may be used to establish a decentralized wireless network known as a Mobile Ad hoc Network (MANET).

SUMMARY

The one or more embodiments provide for a method. The method also includes securing, by a managing node, communication in a network of member nodes including a first member node. Communication is secured using a (k, $n_1$) secret sharing scheme during a first phase, "k" is a first threshold of shares required to resolve a first key used in the first phase, and "$n_1$" is a first total number of shares for the first key. The method also includes announcing, by the managing node, a phase shift to a subsequent phase relative to the first phase. The method also includes securing, by the managing node, communication in the network during the subsequent phase using a (k+x, $n_2$) secret sharing scheme. "x" is at least 1, and k+x is a second threshold of shares required to resolve a second key used in the subsequent phase. "$n_2$" is a second total number of shares for the second key, each of the member nodes is previously in possession of exactly one corresponding unique share for the second key. The first member node is previously in possession of a first unique share for the second key. The method also includes deleting, by the managing node, the first member node from the subsequent phase by broadcasting the first unique share for the second key.

Other aspects of the invention will be apparent from the following description and the appended claims.

BRIEF DESCRIPTION OF DRAWINGS

FIG. 2A shows a pictorial overview of a multi-phase threshold secret sharing scheme with member node deletion, in accordance with one or more embodiments of the invention.

DETAILED DESCRIPTION

Figure 1A:
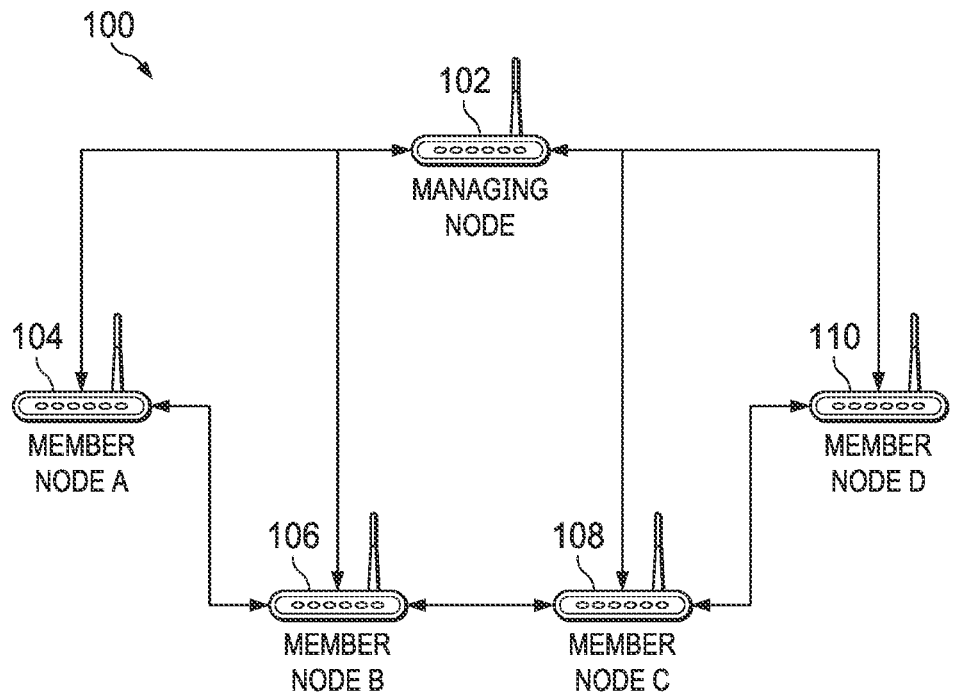
FIG. 1A shows a network of nodes, in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the invention relate to managing membership of nodes within a hardware network. In particular, the one or more embodiments provide a highly secure and computationally efficient solution to the issue of member node deletion in IoT (Internet of Things) and MANET (Mobile Ad-hoc Network) groups that use symmetric keys for communication. Although symmetric key group communication is an efficient technique for encrypting communication between nodes within an established network, member node deletion from groups often requires expensive re-grouping or group-wide re-keying operations.

The term "expensive" refers to an undesirable proportional use of available computing or communication resources. Different proportions of available computing or communication resources used are considered "expensive" for different applications. Thus, for example, an "expensive" re-grouping operation may use a pre-determined percentage of available computing or communication resources in one network, but the same percentage used in another network may not be considered expensive. Nevertheless, if, for a given network, a particular operation is considered "expensive," then a pre-determined amount of available computing resources for that network has been met or exceeded.

Expensive operations in network management may be used from time to time, but it may be desirable to decrease the expense of commonly used operations. For example, if a common network operation, such as deleting a network member node in a dynamically changing network, is considered expensive, then the common network operation may become undesirably expensive. Expensive operations may prevent a desired degree of system performance due to the computation, communication, and storage resources requirements also desirable for other network functions. In other words, if the frequent deletion of member nodes from the network is expensive, then overall system performance of the network may become undesirably low.

The one or more embodiments therefore increase the efficiency of network management, i.e., member node deletion and addition, while maintaining a secure network environment. In particular, the one or more embodiments provide for an improved key management framework that integrates a novel Incremental Threshold Scheme (ITS) cryptographical function into a communication protocol's key rotation mechanism. The key management framework described herein provides for an effective and secure symmetric key communication group member node deletion scheme.

In a symmetric key communication group, each member either has, or can resolve, a single secret key. The single secret key, like a password, can be used to join the network. A sharing scheme can be used to hide the secret key not only from outside users, but also from the members of the network.

Initially, in the one or more embodiments, each node in the network is provided one share useable to resolve the secret key in one phase. Each share in each phase is unique to a give node. Each phase uses a distinct and separate secret key. An example of this operation is shown in FIG. 2A.

Note that the term "share" is counter-intuitive, because, as used herein, a "share" is not a distribution of portions of the secret key itself. For example, if the secret key were "777", then a share might not include the number "7". Rather, a share that allows the resolution of the secret key "777" could be the number "123." The reason for this fact is explained in FIG. 1B through FIG. 1E.

Rather, a "share", and in some cases a required combination of shares, allows a member node to resolve the secret key. Resolving a secret key involves using the share(s) to perform a mathematical operation which takes the share(s) as input and which results in determining the identity of the secret key as output. Examples of such procedures is described with respect to FIG. 1B through FIG. 1E.

The one or more embodiments also rely on the concept of threshold secret sharing. The "threshold" is the number of shares that are required to be used, in combination, to resolve the secret key. Thus, for example, if the threshold is "1", then only 1 share is needed to resolve the secret key. If the threshold is "2", then two shares must be known in order to resolve the secret key. If threshold is "3," then 3 shares must be known in order to resolve the secret key, and so on and so forth.

In the one or more embodiments, the threshold is increased by at least 1 in each phase change. Thus, for example, in phase 1 only one share is required to resolve the secret key, for phase 2 two shares are required to resolve the secret key, for phase 3 three shares are required to resolve the secret key, etc. However, alternative embodiments exist, as explained further below. For example, three shares could be required in phase 1, five shares required in phase 2, etc.

To maintain simplicity for the moment, assume that the threshold starts at 1 and is incremented by 1 during each phase. To delete a node, the managing node broadcasts the secret share for the to-be-deleted node for the subsequent phase, as well as (if applicable) the shares for all previously deleted nodes for the subsequent phase. Broadcasting this information effectively prevents the deleted and to-be-deleted nodes from resolving the subsequent secret key that applies in the subsequent phase. Once a node cannot assemble the subsequent secret key required to communicate with other nodes in the network in the subsequent phase, the node is effectively removed from the network during the subsequent (and future) phases. In other words, the one or more embodiments accomplish node deletion via broadcasting the subsequent phase secret shares belonging to to-be-deleted and previously deleted nodes.

At first, it may seem counter-intuitive to delete a node from a subsequent phase by broadcasting its secret share for the subsequent phase. However, as shown with respect to FIG. 2A, the broadcast forces the to-be-deleted node to have a duplicate copy of its own share for the subsequent phase (i.e., the share that was broadcast, plus the identical share that it already owned from the initial allocation of shares to member nodes). As a consequence, the to-be-deleted node has, for phase "q", q shares for the secret sharing scheme. However, the one or more embodiments have also incremented the threshold. Thus, to resolve the subsequent secret key, a node must have at least, for phase "q+1", q+1 secret shares. Accordingly, the to-be-deleted node has one less share than the threshold number of shares required to resolve the secret key; and hence the to-be-deleted node is effectively removed from the network.

On the other hand, a remaining node in the network does have the required q+1 shares, because the remaining node owns all of the following: 1) the unique share for the subsequent key that belonged to the to-be-deleted node, 2) the unique shares for the subsequent key that belonged to all previously deleted nodes (these would be broadcast at the time of broadcasting the share of the to-be-deleted node), and 3) the unique share for the subsequent key initially assigned to the remaining node. The combination of the broadcast shares results in q shares available to the remaining node in the subsequent phase, and the remaining node also has the one additional share that is required to meet the threshold because the remaining node already possessed the initially allocated share. Thus, any remaining nodes have sufficient shares (i.e., q+1 shares in phase q+1) to resolve the secret key, and accordingly the remaining node can use the secret key to join the network in the subsequent network phase.

The one or more embodiments are computationally efficient and less expensive than known member deletion techniques. In addition, the proposed key management framework alleviates frequent and expensive encrypted tunnel communication for re-grouping operations sometimes used by large and dynamic pervasive computing environments. Additional details regarding the one or more embodiments are now presented with respect to the figures described herein.

FIG. 1A shows a network of nodes, in accordance with one or more embodiments of the invention. The network (100) is defined as the nodes being in communication with each other. The network (100) shown in FIG. 1A includes five nodes in communication with each other, including a managing node (102), member node A (104), member node B (106), member node C (108), and member node D (110). In this example, all nodes are in communication with the managing node (102), and all of member node A (104), member node B (106), member node C (108), and member node D (110) are in communication with each other. However, in other embodiments, the managing node (102) is in communication with all other nodes, but not all member nodes are in communication with each other.

It is assumed that encrypted communication is desirable within the network (100). In other words, it is assumed that not just any new node can join the network, and that it is undesirable for unauthorized devices to access the network (100).

Symmetric key encryption is an efficient encryption technique within an established network. In symmetric key encryption, the managing node (102) controls which member nodes have access to the network (100) via use of a single symmetric key which is, in some manner, made known to or otherwise resolvable by all members of the network. Thus, a symmetric key represents a shared secret between two or more nodes that can be used to maintain a private information link. All nodes within the network have access to the secret key. As used herein, the term "secret," "key," "secret key," etc. all refer to a symmetric key.

An issue can arise when a member node is to be deleted or added, particularly when a member node is to be deleted. The to-be-deleted node has, or had previously resolved, the current symmetric key. Thus, to accomplish deletion, the to-be-deleted node may be deactivated (e.g. communication suspended) or the managing node (102) may change the symmetric key being used throughout the member nodes in the network (100). Once the symmetric key is changed, without informing the to-be-deleted node of the new symmetric key, then the to-be-deleted node can no longer access the network (100). Thus, the to-be-deleted node is removed from the network (100) in this manner. However, both solutions for removing the to-be-deleted node may be impractical for a number of reasons, such as managing a large number of nodes in a dynamic network environment.

One approach to deleting nodes is a pure multi-phase approach. In the pure multi-phase approach, the managing node builds the network in each phase by authenticating each member/node individually under an expensive asymmetric key-based encrypted tunnel for each phase. Upon successful authentication, a symmetric group communication key is delivered to all members nodes. A key rotation mechanism periodically and synchronously refreshes the symmetric key across all the group members nodes to prevent eavesdropping and key cracking.

Using symmetric keys for group communication is efficient and effective. However, both IoT and MANET groups often contain highly dynamic members/nodes. Issues can arise when existing members nodes need to be deleted or revoked. Since the group communication key is symmetric, there is no way to remove the key from the to-be-deleted member/node. Consequently, expensive re-grouping or group-wide re-keying operations are often needed. These operations tend to severely deteriorate system performance as local members nodes usually have only limited resources for computation, communication, and storage. Performance further deteriorates as the group size increases.

Thus, the multi-phase approach is often undesirable for large and/or dynamic networks. The one or more embodiments address these and other issues in order to provide a computationally efficient means for deleting (and adding) nodes to a network in a large and dynamic network environment.

Figure 1B:
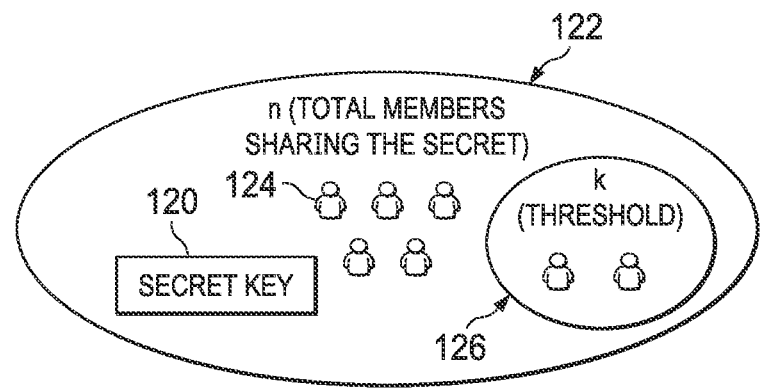
FIG. 1B shows a (k, n) secret sharing scheme, in accordance with one or more embodiments of the invention.
Figure 1C:
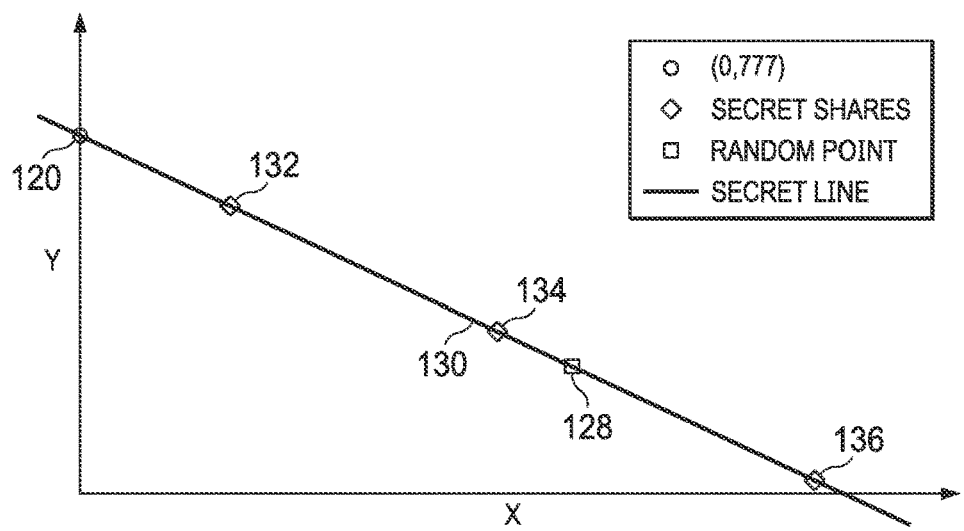
FIG. 1C shows resolving the secret key for the (k, n) secret sharing scheme shown in FIG. 1B, in accordance with one or more embodiments of the invention.
Figure 1D:
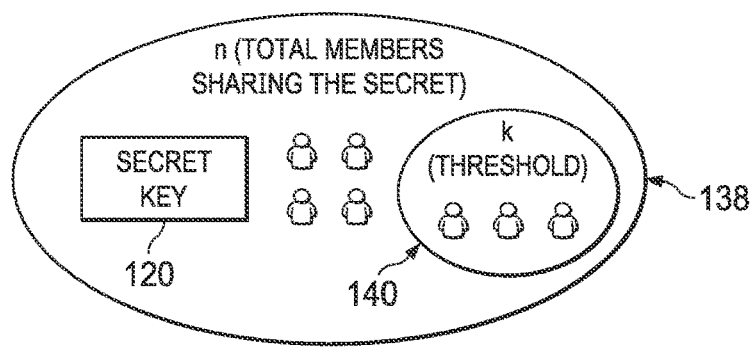
FIG. 1D shows a (k, n) secret sharing scheme, in accordance with one or more embodiments of the invention.
Figure 1E:
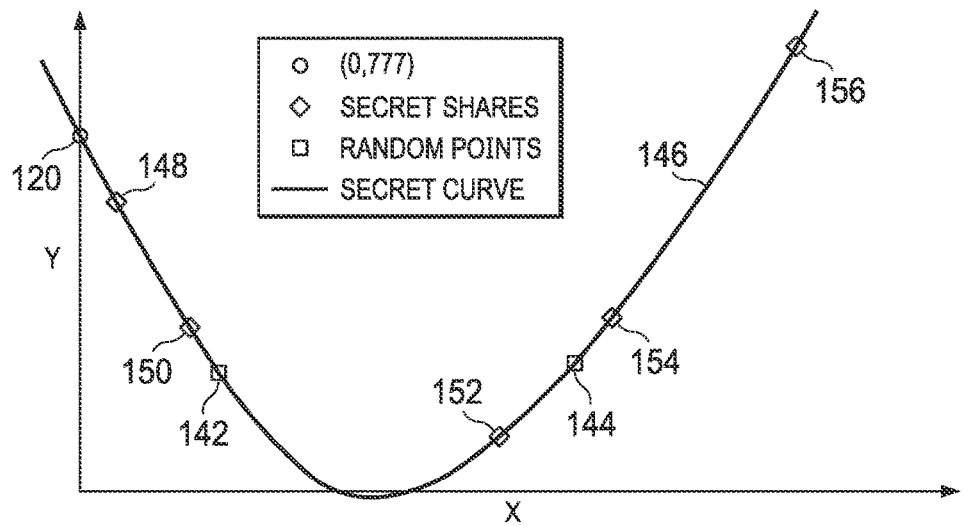
FIG. 1E shows resolving the secret key for the (k, n) secret sharing scheme shown in FIG. 1D, in accordance with one or more embodiments of the invention.

Attention is now turned to how a threshold secret sharing scheme operates and thus be implemented in the network of FIG. 1A. FIG. 1B through FIG. 1C show one example of a (k, n) secret sharing scheme, and resolving the secret key. FIG. 1D and FIG. 1E show another example of a (k, n) secret sharing scheme, and resolving the secret key. FIG. 1B and FIG. 1C together form an example of a (1, n) secret sharing scheme. FIG. 1D and FIG. 1E together form an example of a (2, n) secret sharing scheme. These terms are explained below.

Attention is first turned to an overview of a secret sharing scheme for sharing a secret among members of a network. A secret sharing scheme is directed towards requiring a pre-determined number of shares for a secret key to resolve the secret key. The pre-defined number may be 1, in which case a single member having a single share can resolve the secret key. If the pre-defined number is greater than 1, then any given member must possess more than one share in order to resolve the secret key.

The secret key, once resolved by a member, may be used by the member. For example, a node can use the secret key to sign into a network, or the secret might be the resolution of lost data. Many cryptographic applications exist once the secret is known.

In the secret sharing schemes of the one or more embodiments, there are at least two members who share information about the secret key. The number of members is represented by the term "n".

Note that, during an initial phase 1, the secret key is either directly provided to member nodes, or the secret key may be resolved by a single share owned by a single member. Thus, for initial phase 1, a single share is enough to resolve the key, or the phase 1 key itself is provided to the member nodes.

Different arrangements of the secret sharing scheme can require a different number of shares working together to resolve the secret key. The threshold number of shares required to resolve a secret key is denoted by the term, "k."

In the one or more embodiments, it is assumed that each node has exactly one share. However, it is possible to favor some nodes for network inclusion by providing such favored nodes with more than one share for a given phase. The point being made here is that what is important for resolving the secret key is the number of shares known by any one node, not that nodes necessarily cooperate by give each other shares. Indeed, in one embodiment, the member nodes never communicate shares with each other and thus do not cooperate to resolve the secret key. However, it is possible that nodes could cooperate by communicating shares to each other, but such cooperation may be prevented by programming the member nodes or by using the managing node to issue appropriate commands. In the one or more embodiments, the managing node provides the additional shares needed for remaining network members to resolve the secret key.

In any case, a (k, n) secret sharing scheme requires at least k shares out of n total shares to resolve the secret key. As a specific example, assume there are 10 shares. If the secret sharing scheme is defined to require at least 3 of those 10 shares to resolve the secret key, then this secret sharing scheme would be a (3, 10) secret sharing scheme.

The shares, if taken alone, preferably do not communicate information about the secret key. The secret sharing scheme prevents partial information about the secret key from being given away to any one member. Thus, a node outside of the network, as well as those nodes inside the network, have an equally difficult time guessing at the secret key, even though nodes inside the network have at least one share.

Attention is now turned to demonstrating how the above goals may be accomplished. FIG. 1B and FIG. 1C represent an example of a (2, 7) secret sharing scheme. FIG. 1D and FIG. 1E represent an example of a (3, 7) secret sharing scheme.

In FIG. 1B, there is a secret key (120) and seven members (122). A member may be a network node. The members (122) are represented by the member icons, such as member icon (124). In an embodiment, the secret key (120) is needed by each node in order to join a network of nodes.

Assume that a minimum of two members are required to resolve a secret key. Turning again to FIG. 1B, a (2, 7) secret sharing scheme is demonstrated. Creating the secret shares is accomplished, initially, by creating an imaginary geometric shape from which shares can be drawn and then distributed. The geometric shape may be randomly generated, or may be pre-determined, by the managing node.

The shares are not a division of the key itself, but rather are points on the geometric shape. Thus, a "secret sharing scheme" should not be mistaken for merely distributing parts of the secret key to different members. Rather, each "share" is a piece of information which, if combined with another "share", allows any member which owns information in the combined shares to calculate the secret key. Accordingly, as used herein, a share is "for" a key, and a share is not "of" a key. A share is "for" a key if the share can be used, possibly in combination with another share for the key, to resolve the key according to a threshold secret sharing scheme described with respect to FIG. 1B through FIG. 1E.

In this example, the secret key (120) is represented as being a point on the Y-intercept of an X-Y graph. Thus, the secret key (120) is the number "777" in FIG. 1C. Because a (2, 7) secret sharing scheme is desired, a line is used to generate the secret shares. In particular, a random point (128) is generated on the X-Y axis. The random point is not disclosed to the members sharing the secret, but is known to the managing node. The random point (128) may be a pre-selected, but secret point, in other embodiments. A secret line (130) can then be drawn between the secret key (120), which is at the Y-intercept, and the random point (128). The secret line is known to the managing node, but, initially, is not known to the member nodes.

Each member node receives exactly one secret share, such as secret share (132), secret share (134), and secret share (136). A secret share is a point on the secret line (130). By itself, a single point on the line cannot be used to identify the secret line (130), or to find the Y-intercept of the secret line (130) (again, the Y-intercept is secret key (120)). Thus, a single share conveys no information regarding the identity of the secret key.

One unique share is generated for each member in n. Accordingly, for the (2,7) threshold secret sharing scheme shown in FIG. 1B and FIG. 1C, a total of 7 secret shares (i.e., points on the secret line (130))) are generated. However, only three such secret shares are shown in FIG. 1C for the sake of clarity.

Stated differently, there are 7 shares, one share for each member. Each share is a point on the line. Again, note that each share, by itself, provides no information whatsoever to the individual owner of the share. An individual share owner is no more likely to guess the secret key (120) as any other non-member, because the share by itself provides no way to resolve the secret key (120).

However, two shares can be used to resolve the secret key (120). For example, assume that a member in n is somehow made aware of another share belonging to another member in n. (Such awareness may be from the second member communicating its unique share, by a managing node communicating a unique share, etc.) In this example, assume that the member that owns the secret share (132) is made aware of the secret share (134) that belongs to another member.

The member with two shares can then draw a line between the secret share (132) and the secret share (134), which by definition must be the secret line (130). Once that line is known, the line can be extended to the point on the Y axis which defines the secret key (120). Using algebra that defines the equation for a line, $y=mx+b$, and with knowledge of the secret share (132) and the secret share (134), the Y intercept of the secret line may be calculated exactly. Thus, the value for secret key (120) can be explicitly determined. In this manner the secret key is resolved for the member that became aware of at least two shares.

In the application of network security, the member node (s) that had multiple shares are able to determine the secret key (120), and thus are able to use the secret key (120) as the passcode to join the network. Note that no one member node by itself could join the network; rather, at least two shares must be used in order to resolve the secret key (120) and then join the network. The one or more embodiments take advantage of this threshold secret sharing scheme as described with respect to FIG. 2A through FIG. 4.

It should be emphasized that what is important to resolving the secret key (120) is knowledge of two shares in the scheme of FIG. 1B and FIG. 1C. There are many ways that a given member may become aware of two shares. Again, it is not necessary for members to cooperate with each other if a managing node is present. Members could cooperate with each other to communicate shares amongst each other, and thus be able to resolve the secret.

However, in the one or more embodiments, each member node is initially provided with exactly one share for a given phase. Each member node is not allowed to communicate shares with each other. Instead, the managing node will provide the required additional share according to the techniques described with respect to FIG. 2A through FIG. 3E.

FIG. 1D and FIG. 1E are another example of a threshold secret sharing scheme. However, in this example, the at least three shares are required to resolve the secret key. Thus, FIG. 1D and FIG. 1E provide an example of a (3, 7) threshold secret sharing scheme (where k=3 and n=7), in contrast to the (2, 7) threshold secret sharing scheme of FIG. 1B and FIG. 1C (where k=2, and n=7).

In the example of FIG. 1D and FIG. 1E, the same secret key (120) is used relative to FIG. 1B and FIG. 1C. Thus, the value of the secret key (120) is still "777". Additionally, in this example, assume that each member owns exactly one unique share. Thus, the unique shares for three members are required to resolve the secret key (120). More generally, out of the total membership (138) of n members (i.e., in this example, 7 members), all of the shares for a group (140) of k members (i.e., in this example, 3 members) is required to resolve the secret key (120).

To accomplish this requirement, first generate two random points on an X-Y graph, such as random point (142) and random point (144). Again, in other embodiments, the random point (142) and the random point (144) may be replaced by pre-selected, but secret, points. An imaginary, secret curve (146) may now be drawn through the Y-intercept that is secret key (120), the random point (142), and the random point (144). If the secret curve (146) is in the form of a parabola defined by the equation $ax^2+bx+c$, as shown in FIG. 1E, then three points are needed to define the parabola to satisfy the set of constants: $\{a, b, c\}$. Again, the random point (142) and the random point (144) are not made known to the members.

Shares may now be defined as points in the X-Y graph that lie along the secret curve (146). In this example, only 5 shares are shown for clarity (share (148), share (150), share (152), share (154), and share (156)), though in the one or more embodiments there are 7 shares (i.e., one per member).

Any member that is aware of three shares, and knowing that a (3, n) secret sharing scheme is in effect, can determine the values of $\{a, b, c\}$ using the equation $ax^2+bx+c$, and thus can exactly define the secret curve (146). From there, the member can determine the Y-intercept of secret curve (146), which by definition is the secret key (120). Thus, the secret key (120) may be resolved by any member node knowing 3 of the shares in the (3, 7) secret sharing scheme.

Again, it is not necessary for the members to cooperate with each other in order to become aware of multiple shares. In the one or more embodiments the managing node initially provides each node with exactly one unique share. The managing node, using the procedures described with respect to FIG. 2A, distributes the unique shares for two other nodes (i.e., to-be-deleted nodes and/or previously deleted nodes) to the n=7 nodes. In this manner, all remaining nodes will have the k=3 shares required to resolve the secret key (120), but the to-be-deleted and/or previously deleted nodes will only have k=2 shares, and thus will not be able to resolve the secret key (120) in a (3, 7) threshold secret sharing scheme. FIG. 2A describes this procedure.

The one or more embodiments shown with respect to FIG. 1B through FIG. 1E may be extended to k=4 or higher. For example, for k=4, a curve can be drawn using the secret key (120) as the Y-intercept and three additional random or pre-selected points, where the curve that fits the four total points satisfies the equation $ax^3+bx^2+cx+d$. Shares along this curve can then be generated as points on that curve. The shares are then distributed among the members n, and 4 shares are required to resolve the secret key (120) using algebra in a manner similar to that described above.

Note that, by itself, the threshold secret sharing scheme described above is not practical for a large and dynamic network of nodes. For example, the threshold secret sharing schemes of FIG. 1B through FIG. 1E do not address the issue of deleting member nodes in a dynamic network which has computationally limited resources. Thus, the one or more embodiments addresses the issue of expensive re-grouping or re-keying operations in large and dynamic pervasive computing groups by enabling an effective and secure member node deletion method.

Note, also, that other approaches to implementing a shared (k, n) secret sharing scheme are possible. The one or more embodiments are not necessarily limited to the (k, n) secret sharing scheme described with respect to FIG. 1B through FIG. 1E.

Again, the one or more embodiments build on (k, n) secret sharing schemes. A summary of the one or more embodiments is already provided above. However, attention is now turned to the details of the one or more embodiments, which may be characterized as a multi-phase threshold secret sharing scheme with member node deletion.

FIG. 2A shows a pictorial overview of a multi-phase threshold secret sharing scheme with member node deletion, in accordance with one or more embodiments of the invention. FIG. 2A is divided into "concepts." The term 'concept' is used, because the procedural steps are not necessarily divided into nine-stages, as shown in FIG. 2A. The steps for performing the one or more embodiments are described more properly with respect to FIG. 3A through FIG. 3E. Rather, in FIG. 2A, the concepts are presented in an order meant to convey clearly and precisely how the broadcast of a share for a to-be-deleted node will delete that node from the network.

Concept 1 is that the managing node initially defines keys and shares for the keys: One key per phase, one share per node. Each phase is an operational period of time of the network, which may or may not be related to a network phase in other senses of "phase". In this example, there are just two phases and five nodes. However, many phases may exist (up to L phases, as explained further in FIG. 2B). Additionally, many more, or possibly fewer, nodes may be present.

For phase 1, the secret key is $k^1$. A first set of shares is defined for $k^1$. The first set of shares are shares along a first secret curve, similar to the descriptions of FIG. 1B through FIG. 1E. In this example, for clarity, the first set of shares are represented abstractly as the letters $\{A, B, C, D, E\}$. However, each letter represents a pair of numbers that define a point on an X-Y plane in FIG. 1C. Each point is a point on the secret curve, to which the secret key, $k^1$, is the Y-intercept in FIG. 1C.

For phase 2, the secret key is $k^2$, which is different than $k^1$. A second set of shares is defined for $k^2$. The second set of shares are shares along a second secret curve, similar to the descriptions FIG. 1E. In this example, for clarity, the second set of shares are represented abstractly as the letters $\{F, G, H, I, J\}$. However, each letter represents a pair of numbers that define a point on an X-Y plane in FIG. 1E. Each point is a point on the secret curve, to which the secret key, $k^2$, is the Y-intercept in FIG. 1E.

Attention is now turned to Concept 2. Concept 2 is that the managing node distributes shares for both keys to the member nodes in an initial share vector distribution. Each node receives exactly one unique share for a given key. Thus, for example, node 1 receives share $\{A\}$ of key 1 for use during phase 1, and node 1 also receives share $\{F\}$ of key 2 for use during phase 2. Together, the Node 1 share for phase 1, $\{A\}$, combined with the Node 1 share for phase 2, $\{F\}$, form a share vector. Thus, a share vector, in the one or more embodiments, is a set of unique shares assigned to a given node, where each unique share is exactly one share for a key for use in a given phase.

In turn, node 2 receives share $\{B\}$ of key 1 for use during phase 1, and node 2 also receives share $\{G\}$ for use during phase 2. Thus, the share vector for Node 2 is $\{B, G\}$, where $\{B\}$ is the unique share assigned to Node 2 that is used, in part, to resolve key 1 in phase 1, and where $\{G\}$ is the unique share assigned to Node 2 that is used, in part, to resolve key 2 in phase 2.

Node 3, Node 4, and Node 5 receive their own share vectors in a similar manner. The ellipses in concept 2 indicate the corresponding share vectors transmitted by the managing node and received by the corresponding member nodes.

Attention is now turned to Concept 3. Concept 3 is a re-presentation or summary of the results of the managing node's distribution of share vectors described with respect to Concept 2, from the perspective of the member nodes. In other words, Concept 3 shows the information possessed by each node as a result of Concept 2. Note that each node only receives the shares indicated. Thus, for an individual phase, each node only initially possesses one unique share, regardless of the threshold number of shares required to resolve the secret key.

Attention is now turned to concept 4. Concept 4 is that the managing node enforces network security by using a (k, n) incremented threshold secret sharing scheme, where each phase increments the threshold by at least 1. Thus, for example, in phase 1, k=1, meaning that the share provided to a node for phase 1, by itself, is sufficient to resolve the secret key. Note that, in the alternative, the key itself may be provided to the nodes; in other words, the single share provided to the member nodes in phase 1 may be the key itself. However, the single share could also be some other information which is part of a scheme which hides the secret key.

However, in phase 2, k=2, meaning that at least two shares are required to resolve the secret key during phase 2. Note, for now, that each member node only has one share per phase as initially provided by the managing node. Thus, without more, no members could remain part of the network because two shares for the phase 2 secret key are required to resolve the phase 2 secret key, but each member node only has one such share. The number, n, is the number of nodes, which remains 5 in both phases in this particular example.

On the other hand, once a member node has the k number of shares required in the current phase set by the managing node, then the member node is able to resolve the secret key set by the managing node for the current phase. Once the secret key is resolved, the member node may use the secret key to join the network in the current phase.

As indicated above, for phase 2, at least 2 shares are needed by any one node for that node to resolve the secret key in phase 2. However, as also indicated above, initially each node only possesses one unique share for phase 2. The other share for the (2, 5) secret sharing scheme used in phase 2 will be provided by the managing node via a broadcast.

Attention is now turned to Concept 5. Concept 5 is a summary of network operations during phase 1. Again, each node has one share. In Phase 1 a (1, 5) threshold scheme is in effect. Because, in Phase 1, only 1 share is needed to reconstruct the key, every node can resolve the key and is able to use the secret key to join or otherwise become a member of the network.

Attention is now turned to Concept 6, which begins the description of deleting a member node from the network by means of the managing node issuing a phase shift command and broadcasting shares for the to-be-deleted node and previously deleted nodes. Initially, the managing node determines that Node 1 should be deleted from the network. The determination may be a command generated at the managing node, a request received by the managing node from a user or a form a device, or any other determination mechanism.

In turn, the managing node broadcasts, to all member nodes, a phase shift command to move phase 2. During phase 2, the (2, 5) threshold secret sharing scheme is in effect. Thus, two shares are required to resolve the secret key in phase 2. However, as explained above, each member node only initially started with one unique share for phase 2.

To remedy this share deficiency for the remaining nodes, while simultaneously deleting the to-be-deleted member node, the managing node broadcasts the unique share for phase 2 belonging to the to-be-deleted node. In this case, the to-be-deleted node is Node 1. Thus, every member node in the network receives the share, for resolving key 2 during phase 2, that was initially assigned to Node 1 for phase 2.

Attention is now turned to Concept 7. Again, as a summary of Concept 6, every member node receives Node 1's initially assigned unique share assigned for use during phase 2. Thus, during phase 2, every node now has two shares, as shown in FIG. 2A at concept 7.

For example, Node 2 has share {F} (the share for to-be-deleted Node 1) and share {G} (the share initially assigned to Node 2). Because Node 2 has two shares, and because the threshold for phase 2 is "2", Node 2 has sufficient shares to resolve the secret key. As a result, Node 2 is able to use the secret key to join the network. A similar result occurs for Node 3, Node 4, and node 5, as each of those nodes now have share {F} (the share belonging to to-be-deleted Node 1 for phase 2), plus the share for phase 2 uniquely assigned to each corresponding node.

Attention is now turned to Concept 8. Concept 8 is to take special notice from Concept 7 that, after the broadcast of Node 1's share, Node 1 has a duplicate of its own share. Node 1 has one copy of share {F} because share {F} was initially assigned to Node 1. Node 1 has a second copy of share {F} because the managing node broadcast share {F} as one of the two shares to be used to resolve the second secret key for use during phase 2.

Attention is now turned to Concept 9. Concept 9 is that Node 1 is deleted from the network because it has, effectively, only one share instead of two.

In effect, Node 1 has only one share because Node 1 received a duplicate of its own share. However, because the threshold is 2 during phase 2, only one share is insufficient to resolve the second secret key used in phase 2. As a result, Node 1 cannot resolve the second secret key, and thus cannot use the second secret key to join the network. Because Node 1 cannot join the network, Node 1 is effectively removed (i.e. deleted) from the phase 2 network.

In contrast, as indicated above in Concept 7, all other member nodes have two distinct shares for phase 2. Thus, all other member nodes can resolve the secret key in use for phase 2, and thus remain members of the network.

The example of FIG. 2A can easily be extended to a desired number of nodes, a desired number of phases, a desired number of keys, and a desired number of shares. Deletion of a node is accomplished by switching to a new phase and broadcasting the shares for the to-be-deleted node and all previously deleted nodes. The previously deleted node shares assigned for use during phase q+1, in combination with the to-be-deleted node share for use during phase q+1, form the additional shares needed to satisfy the threshold number of shares, k, for the threshold secret sharing scheme in use during the subsequent phase q+1.

Figure 2B:
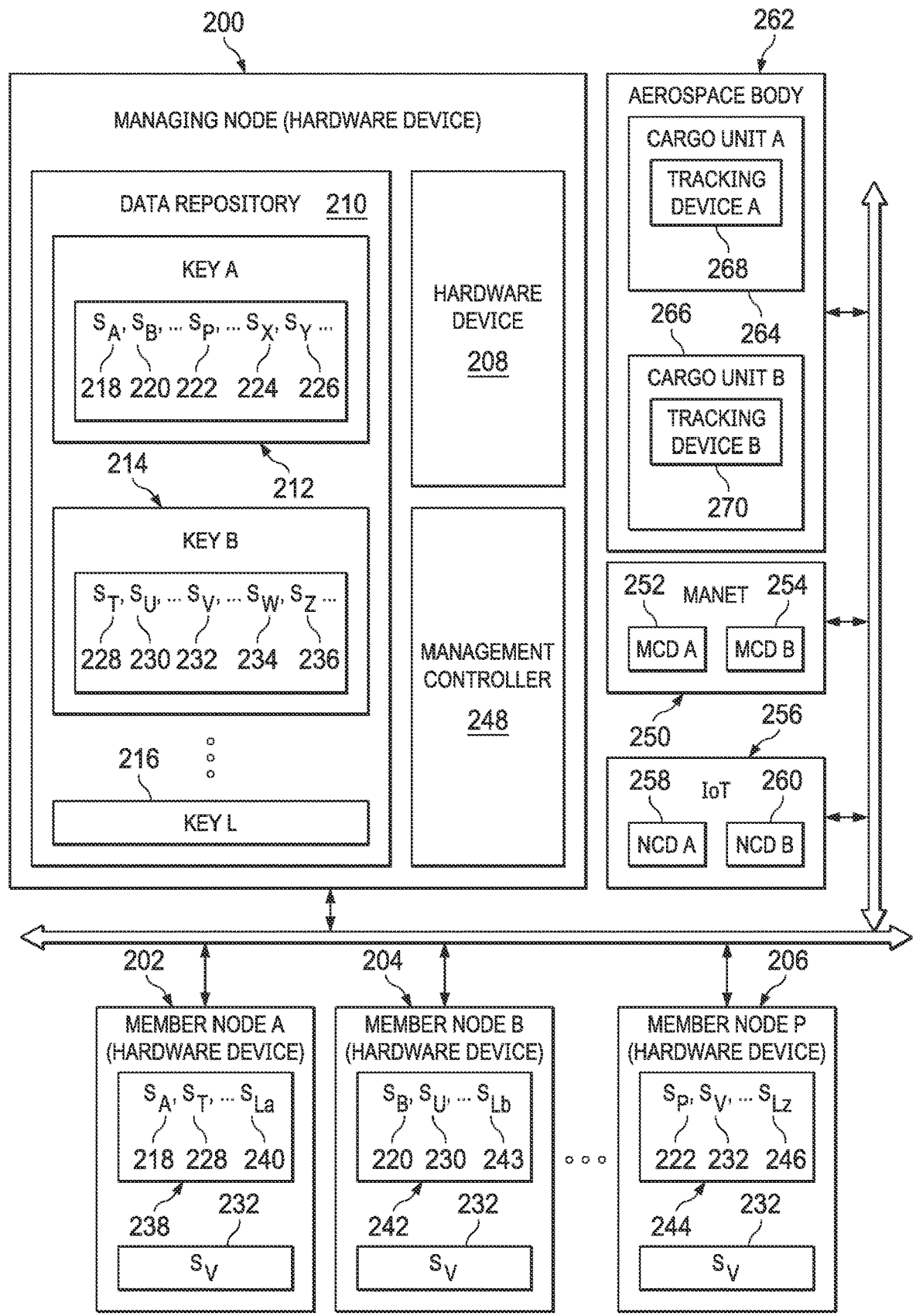
FIG. 2B shows a system for deleting a node from a network, in accordance with one or more embodiments of the invention.

The one or more embodiments described with respect to FIG. 2A may be termed a "multi-phase incremental threshold secret sharing scheme." Attention is now turned to FIG. 2B. FIG. 2B is an example of a system for performing network security using a multi-phase incremental threshold secret sharing system.

The system shown in FIG. 2B may be characterized as a network that includes a managing node (200) and several member nodes. In this example, three member nodes are present, Member Node A (202), Member Node B (204), and Member Node P (206). More or fewer member nodes and/or managing nodes may be present in other embodiments.

Security in the system shown in FIG. 2B is enforced via a multi-phase incremental threshold secret sharing scheme enforced by the managing node (200), in which shares for a secret key, assigned to each node for each phase, are distributed among the member nodes. Each member node has a unique share for the secret key that applies to a given phase.

In this example, the Member Node P (206) is a "to-be-deleted node". In other words, the Member Node P (206) is initially part of the network; however, the managing node (200) receives a request to delete the Member Node P (206) from the network, or otherwise determines that the Member Node P (206) should be deleted from the network.

The managing node (200) includes a hardware device (208), which includes a processor and communication hardware. The processor and/or communication hardware enables wired or wireless communication between the managing node (200) and the member nodes: Member Node A (202), Member Node B (204), and Member Node P (206).

The managing node (200) is configured to create and maintain a list of "L" keys, corresponding to "L" phases of a multi-phase threshold secret sharing scheme established by the managing node. Thus, the managing node (200) includes a data repository (210) which stores Key A (212), Key B (214), through Key L (216). Each individual key is pre-determined to be used in a pre-selected phase, "$q_L$".

In the system of FIG. 2B, Key A (212) represents the key being used in the current phase, "q". Past keys (not shown) may also be stored in the data repository (210). The term "current phase" is defined as the phase being used in the multi-phase secret sharing scheme during which the managing node (200) receives or generates a command to delete the Member Node P (206) from the network.

In the system of FIG. 2B, the Key B (214) represents the key to be used in a subsequent phase, "q+1", in which the Member Node P (206) is to be deleted. Key A (212) is different than Key B (214).

Shares are generated for the Key A (212), and all other keys. As indicated above, the shares are generally not a division of the keys, but rather are points on an imaginary secret curve as explained above. Thus, the term "share for" a key is used, rather than the term "share of" a key. Again, a share is "for" a key if the share can be used, possibly in combination with another share for the key, to resolve the key according to a threshold secret sharing scheme described with respect to FIG. 1B through FIG. 1E.

The shares for Key A (212) are identified by $S_A$ (218), $S_B$ (220), through $S_P$ (222), and may also include additional shares such as $S_X$ (224), $S_Y$ (226), etc. Each share for Key A (212) will be uniquely assigned to one member node.

The shares for Key B (214) are identified by $S_T$ (228), $S_U$ (230), through $S_V$ (232), and may also include additional shares such as $S_W$ (234), $S_Z$ (236), etc. note that the shares for Key B (214) may have nothing in common with the shares for Key A (212). However, the shares for Key B (214) are similar in concept to the shares for Key A (212), in that the shares for Key B (214) were generated according to an incremented threshold secret sharing scheme, as described with respect to FIG. 1B through FIG. 1E. Each share for Key B (214) will be uniquely assigned to one member node.

The shares for Key L (216) are also present. However, for clarity, the share for Key L (216) are omitted from FIG. 2B.

The managing node (200) assigns share vectors to the member nodes. A share vector is exactly one unique share for each key. Thus, a share vector is a one by L set of shares.

Thus, for example, Member Node A (202) has a share vector (238) composed of the first share for each key. Thus, the share vector (238) initially assigned to the Member Node A (202) is $S_A$ (218) (one share for Key A (212)), $S_T$ (218) (one share for Key B (214)), through $S_{La}$ (240) (one share for Key L). Again, each key is used in a distinct, different phase. Accordingly, during any given phase, a node initially has exactly one share.

Similarly, Member Node B (204) has a share vector (242) composed of the second share for each key. Thus, the share vector (242) initially assigned to the Member Node B (204) is $S_B$ (220) (one share for Key A (212)), $S_U$ (230) (one share for Key B (214)), through $S_{Lb}$ (243) (one share for Key L).

Similarly, Member Node P (206) has a share vector (244) composed of the third share for each key. Thus, the share vector (244) initially assigned to the Member Node P (206) is $S_P$ (222) (one share for Key A (212)), $S_V$ (232) (one share for Key B (214)), through $S_{Lz}$ (246) (one share for Key L).

As mentioned above, the Member Node P (206) is designated by the managing node (200) as a "to-be-deleted" node. The Member Node P (206) may be characterized as a "first member node" within the member nodes, for convenient reference. As described above, the first member node has a first unique share for a current key in a current phase in the multi-phase threshold secret sharing scheme. In this example, $S_P$ (222) is that unique share.

The system shown in FIG. 2B also includes a management controller (248). The management controller (248) is software and/or application specific hardware stored in the managing node (200). Thus, the management controller (248) could be stored in the data repository (210), in some embodiments, but is shown as being separate in FIG. 1A because the management controller (248) may or may not be stored in the same memory as the keys.

The management controller (248) is executable by the managing node (200) to control operations of the managing node (200), and thereby control operation of the network composed of the managing node (200), the Member Node A (202), the Member Node B (204), and the Member Node P (206). The management controller is programmed, when executed, to follow the methods described with respect to FIG. 3A through FIG. 3E. The methods of FIG. 3A through FIG. 3E describe the method of distributing shares for the keys in order to accomplish deletion of the Member Node P (206).

In other words, the management controller (248) is the hardware and/or software executable to accomplish deletion of the Member Node P (206) according to the one or more embodiments described herein. Deletion is accomplished because the first member node (the Member Node P (206)) is unable to communicate with other members of the network during the subsequent phase. In particular, deletion is accomplished by broadcasting $S_V$ (232), and the shares for all previously deleted nodes for phase q+1, to all member nodes when the managing node shifts the phase to phase q+1.

In other words, during phase q+1, each member node has the following shares for Key B (214): 1) The shares for phase q+1 assigned to all previously deleted nodes, 2) the shares for phase q+1 assigned to Member Node P (206), and 3) the unique share assigned to the corresponding member node. However, the Member Node P (206) lacks a share, because Member Node P (206) only has a duplicate of its share for phase q+1 as a result of the broadcast. Thus, Member Node P (206) only has q shares in a threshold secret sharing scheme where k (the threshold) is equal to q+1.

Accordingly, Member Node P (206) cannot resolve the Key B (214), and is effectively forced out of the network. Stated differently, the first member node is unable to communicate with other members of the member nodes during the subsequent phase because the first member node is unable to assemble the subsequent key in the subsequent phase, due to having one fewer share than required to resolve the subsequent key.

The management controller (248) may be programmed with different node deletion schemes. The alternative deletion schemes are described with respect to FIG. 3B through FIG. 3E.

The one or more embodiments described above may be varied. For example, any of Member Node A (202) through Member Node P (206) may be mobile computing devices (MCD) that form a mobile ad-hoc network (MANET). Thus, for example, the system of FIG. 2B may also include MANET (250). The MANET (250) includes two or more mobile computing devices, such as MCD A (252) and MCD B (254). The mobile computing devices may be mobile phones, tablet computers, laptop computers, special purpose computers, and the like. MCD A (252) and MCD B (254) may be treated as nodes, as described above, and thus may be deleted just as Member Node P (206) was deleted.

In another example, any of Member Node A (202) through Member Node P (206) may be network capable devices (NCD) that form an internet-of-things (IoT). Thus, for example, the system of FIG. 2B may also include IoT (256). The IoT (256) includes two or more network capable devices, such as NCD A (258) and NCD B (260). The network capable devices may be tracking devices, or network capable machines such as smart appliances, smart lights, smart thermostats, security devices and the like. NCD A (258) and NCD B (260) may be treated as nodes, as described above, and thus may be deleted just as Member Node P (206) was deleted.

The system of FIG. 2B may also be used to track inventory by applying network capable devices to cargo units and tracking the cargo units, such as Cargo Unit A (264) and Cargo Unit B (266), as they enter and leave a cargo area. In a specific example, the system of FIG. 2B may be an aerospace body (262), such as aerospace body (400) in FIG. 4.

The aerospace body (262) is in communication with the managing node (200) and the member nodes, which in this case are Tracking Device A (268) and Tracking Device B (270), which are disposed in, on, or otherwise are associated with, the Cargo Unit A (264) and the Cargo Unit B (266), respectively. In this case, the managing node (200) is further configured to track addition or removal of ones of the cargo units from the aerospace vehicle (262) by adding and deleting ones of the member nodes from the network according to the procedures described above and further described with respect to FIG. 3A through FIG. 3E.

In one or more embodiments of the invention, the data repository (210) is a type of storage unit and/or device (e.g., a file system, database, collection of tables, or any other storage mechanism) for storing data. Further, the data repository (210) may include multiple different storage units and/or devices. The multiple different storage units and/or devices may or may not be of the same type or located at the same physical site.

While FIG. 2B shows a configuration of components, other configurations may be used without departing from the scope of the invention. For example, various components may be combined to create a single component. As another example, the functionality performed by a single component may be performed by two or more components.

Figure 3A:
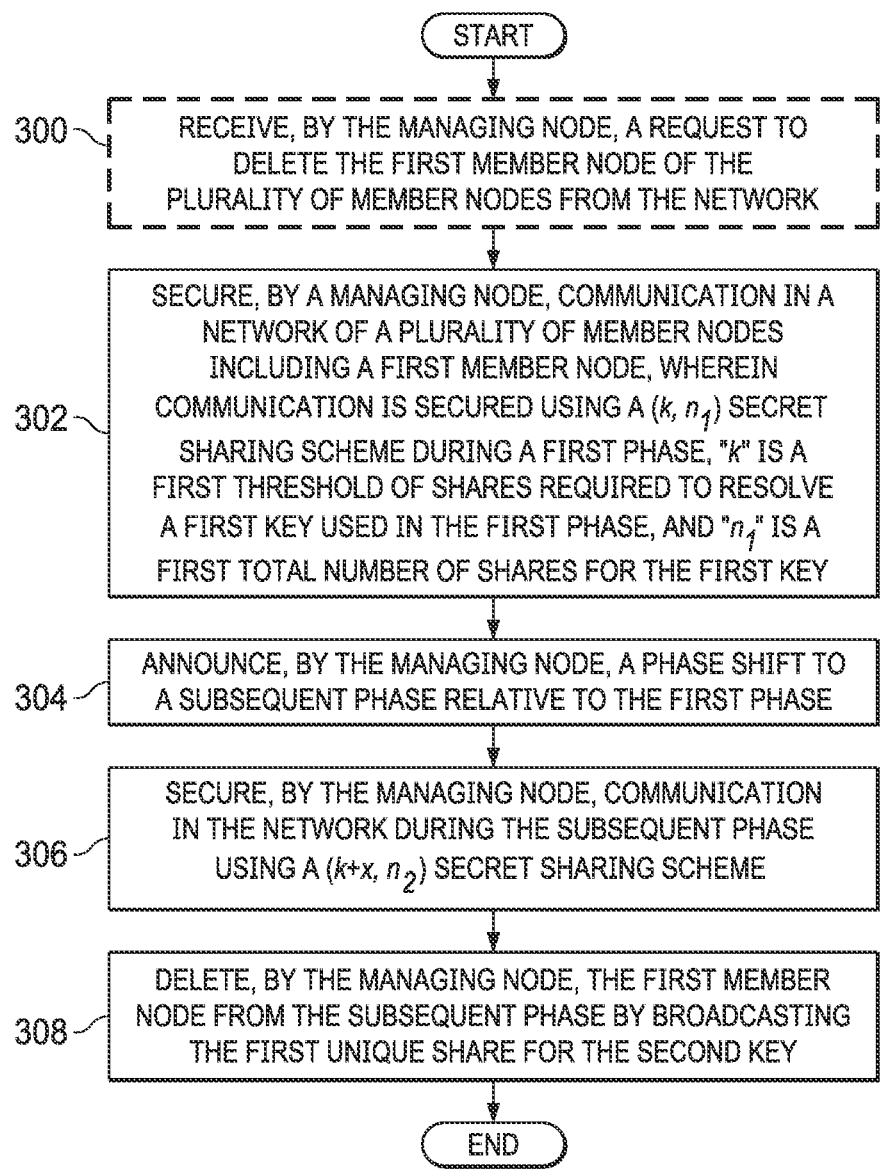
FIG. 3A shows a method of deleting a node, including possibly deleting multiple nodes, in accordance with one or more embodiments of the invention.
Figure 3B:
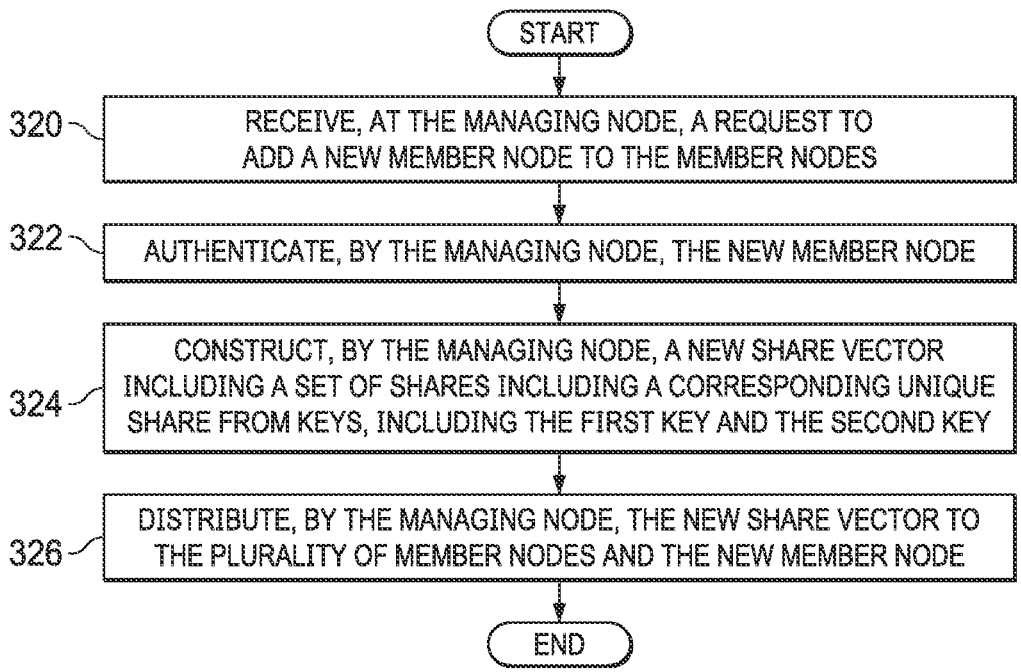
FIG. 3B shows a method of adding a node to the network after deleting a node from the network, in accordance with one or more embodiments of the invention.
Figure 3C:
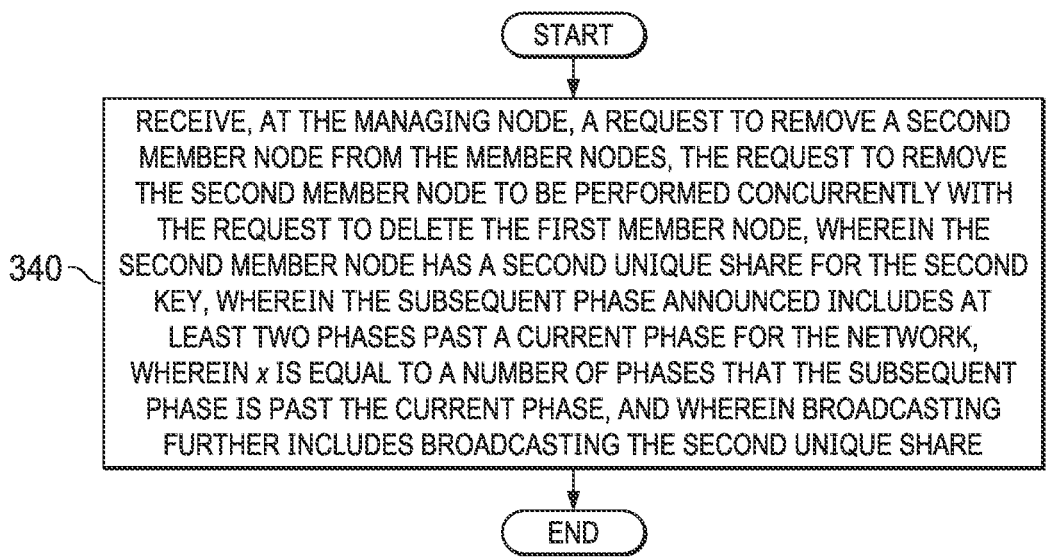
FIG. 3C shows an alternative method of deleting two nodes concurrently, in accordance with one or more embodiments of the invention.
Figure 3D:
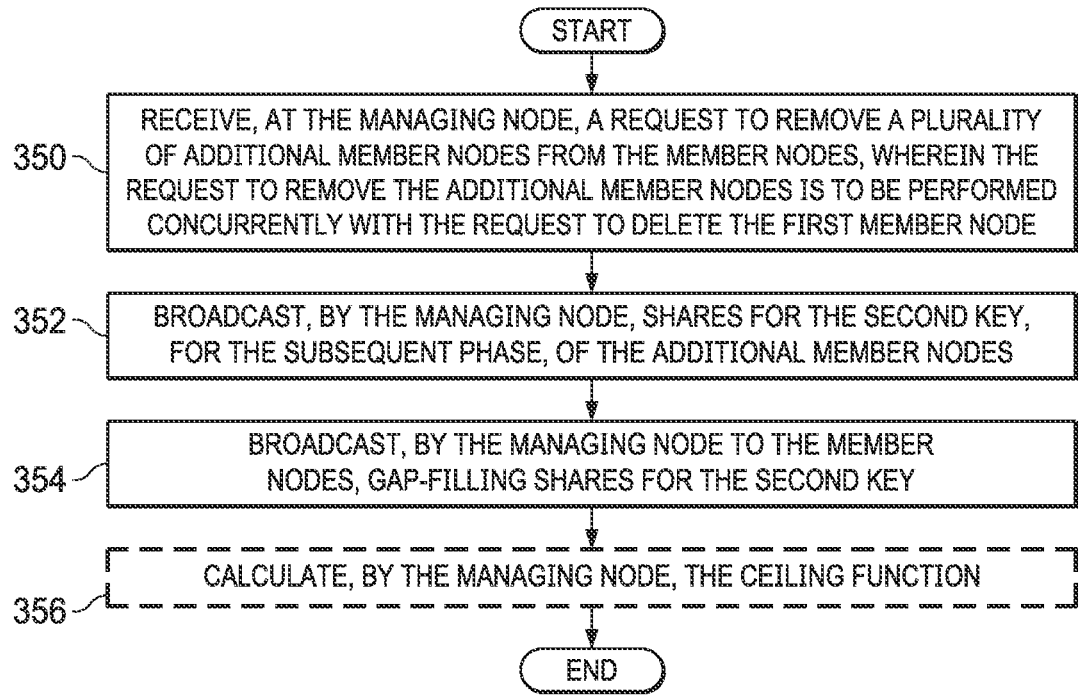
FIG. 3D shows an alternative method of deleting two or more nodes concurrently, in accordance with one or more embodiments of the invention.
Figure 3E:
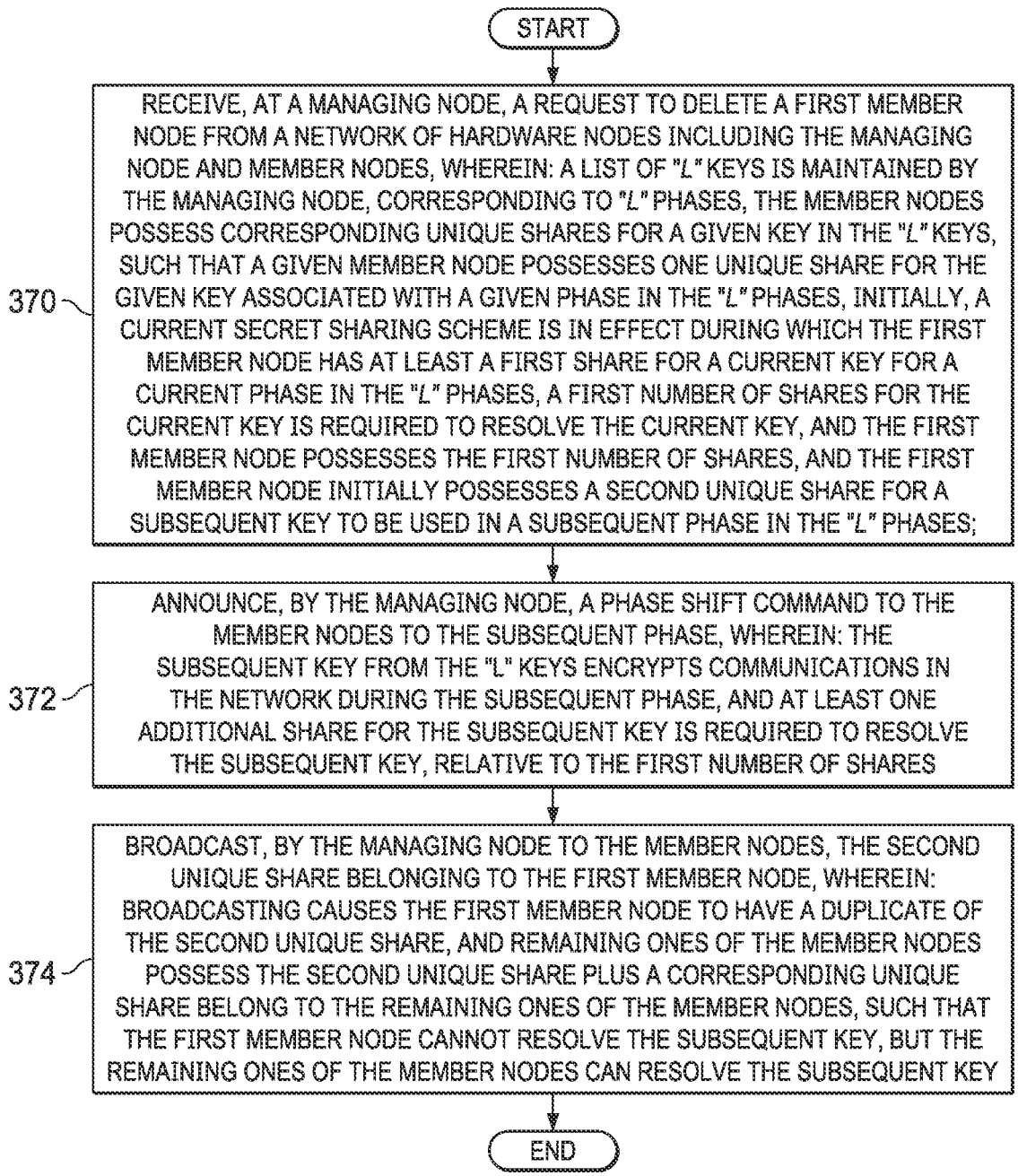
FIG. 3E shows an alternative method of deleting a node, including possibly deleting multiple nodes, in accordance with one or more embodiments of the invention.

FIG. 3A, FIG. 3B, FIG. 3C, FIG. 3D, and FIG. 3E show flowcharts of methods of managing a network of nodes, in accordance with one or more embodiments of the invention. In particular, FIG. 3A describes a method of deleting a node, including possibly deleting multiple nodes. FIG. 3B shows a method of adding a node to the network after deleting a node from the network. FIG. 3C shows an alternative method of deleting two nodes concurrently. FIG. 3D shows an alternative method of deleting two or more nodes concurrently. FIG. 3E shows yet another alternative method of deleting a network node. The methods of FIG. 3A, FIG. 3B, FIG. 3C, FIG. 3D, and FIG. 3E may be implemented using a management controller of a managing node, such as the management controller (248) of the managing node (200) in FIG. 2B.

Attention is first turned to FIG. 3A. Optionally, at Step 300, the managing node receives a request to delete the first member node of the plurality of member nodes from the network. The step is optional because the managing node may be programmed to delete a member node according to the programming of the managing node. Alternatively, a human technician could command the managing node to delete a member node.

At step 302, the managing node secures communication in a network of a plurality of member nodes including a first member node, wherein communication is secured using a (k, $n_1$) secret sharing scheme during a first phase, "k" is a first threshold of shares required to resolve a first key used in the first phase, and "$n_1$" is a first total number of shares for the first key. The procedures for such communication are described above with respect to FIG. 1B through FIG. 2A.

At step 304, the managing node announces a phase shift to a subsequent phase relative to the first phase. Announcing the phase may be accomplished via a broadcast. The phase scheme may be separate from, or the same as, other network operational phases.

At Step 306, the managing node secures communication in the network during the subsequent phase using a (k+x, $n_2$) secret sharing scheme. Now, "x" is at least 1, and k+x is a second threshold of shares required to resolve a second key used in the subsequent phase. In turn, "$n_2$" is a second total number of shares for the second key. Each of the member nodes is previously in possession of exactly one corresponding unique share for the second key. The first member node is previously in possession of a first unique share for the second key.

At Step 308, the managing node deletes the first member node from the subsequent phase by broadcasting the first unique share for the second key. If prior nodes had already been deleted in prior phases, then the shares for all previously deleted nodes for the subsequent phase would also be broadcast along with the first unique share. Broadcasting the first unique share effectively deletes the first member node, because the first member node has one fewer share than the threshold as a result of the broadcast.

Specifically, after broadcasting, the first member node has a duplicate copy of the first unique share for the second key, such that the first member node has k shares for the second key and cannot resolve the second key. Remaining ones of the plurality of member nodes have k+x shares for the second key (with "x" being at least 1), being the exactly one corresponding unique share for the second key plus the first unique share for the second key that was broadcast. Thus, the remaining ones of the plurality of member nodes can resolve the second key.

The method of FIG. 3A may be varied. For example, $n_1$ has a first value equivalent to a second value of $n_2$. In other words, the total number of shares may be the same in both the current phase and the subsequent phase. Stated still differently, although a node may be effectively deleted from the network, the number of shares remains constant because the shares for the to-be-deleted and previously deleted nodes will be required for future remaining nodes to resolve the secret key.

In another variation, x is greater than 1. In other words, the number of phases and the threshold being advanced is greater than 1 more than the current phase and threshold. This step may be taken with respect to deleting two or more nodes concurrently, as described further below with respect to FIG. 3C and FIG. 3D.

Attention is now turned to FIG. 3B, which is a method of adding new member node to the network. The method of FIG. 3B may be performed before or after the method of FIG. 3A. Thus, the order of reference numerals relative to the two figures does not necessarily imply that the method of FIG. 3B occurs after the method of FIG. 3A.

At step 320, the managing node receives a request to add a new member node to the plurality of member nodes. The request may be generated by the managing node itself, received from a human technician, generated by a member node which is programmed to request deletion, etc.

At step 322, the managing node authenticates the new member node. Authentication may be performed by a variety of means, such as but not limited to a password, a biometric scan, a pin number, a recognition of a type of hardware, etc.

At step 324, the managing node constructs a new share vector including a set of shares, including a corresponding unique share from keys, including the first key and the second key. The new share vector may be created by assigning a new set of shares for at least the current phase and all future L phases planned for use by the managing node. Again, the share vector contains a single unique share for a corresponding key to be used in a corresponding phase.

At step 326, the managing node distributes the new share vector to the member nodes, including the new member node. Distribution of the new share vector may be performed via an encrypted tunnel or other secure process so that other nodes do not receive the shares provided in the new share vector.

Attention is now turned to FIG. 3C, which is a method of deleting two or more nodes concurrently. The method of FIG. 3C may be described as a Leaped Incremental Threshold Scheme (LITS), which is further detailed below. The method of FIG. 3C is performed after the method of FIG. 3A.

At step 340, the managing node receives a request to remove a second member node from the member nodes, the request to remove the second member node to be performed concurrently with the request to delete the first member node, wherein the second member node has a second unique share for the second key, the subsequent phase announced comprises at least two phases past a current phase for the network, x is equal to a number of phases that the subsequent phase is past the current phase, and broadcasting further includes broadcasting the second unique share. The term "leaped" is used because multiple phases ahead of the current phase are selected to be the subsequent phase; i.e., certain phases past phase q are skipped or leapt past. While this procedure may not take advantage of the intervening phases, this procedure can accommodate the concurrent deletion of multiple nodes.

Attention is now turned to FIG. 3D, which is a method of deleting two or more nodes concurrently. The method of FIG. 3D may be described as a Gapped Incremental Threshold Scheme (GITS), which is further detailed below. The method of FIG. 3D is performed after the method of FIG. 3A.

At step 350, the managing node receives a request to remove additional member nodes from the member nodes, wherein the request to remove the plurality of additional member nodes is to be performed concurrently with the request to delete the first member node. Again, the request may be received in a variety of different ways, as described above with respect to FIG. 3A through FIG. 3C.

At step 352, the managing node broadcasts shares for the second key, for the subsequent phase, of the additional member nodes. Additionally, at step 354, the managing node broadcasts, to the member nodes, gap-filling shares for the second key. Gap-filling shares are share which are generated by the managing node in order to make up for shares that are needed when the managing node is advancing to a phase less than the newly designated threshold. The gap-filling shares provide the shares needed by the remaining member nodes to satisfy the threshold and remain in the network.

In an embodiment, the subsequent phase is defined by a ceiling function. In this case, the method of FIG. 3D may include additional optional steps.

In particular, at optional step 356, the managing node calculates the ceiling function. Calculation of the celling function is described further, below. Then, the broadcasting of the gap-filling shares at step 354 is modified such that a number of gap-filing shares equal to the ceiling function are broadcast.

Attention is now turned to FIG. 3E. FIG. 3E is a variation of the method shown in FIG. 3A. The method of FIG. 3E may be performed using the system shown in FIG. 2B according to the procedures described with respect to FIG. 1B through FIG. 2A. Note that the reference numerals of FIG. 3E have no correspondence to the reference numerals used with respect to FIG. 3A through FIG. 3D.

At step 370, a managing node receives a request to delete a first member node from a network of hardware nodes including the managing node and member nodes including the first member node. A list of "L" keys is maintained by the managing node, corresponding to "L" phases. The member nodes possess corresponding unique shares for a given key in the "L" keys, such that a given member node possess one unique share for the given key associated with a given phase in the "L" phases. Initially, a current secret sharing scheme is in effect during which the first member node has at least a first share for a current key for a current phase in the "L" phases. A first number of shares for the current key is required to resolve the current key, and the first member node possesses the first number of shares. The first member node initially possesses a second unique share for a subsequent key to be used in a subsequent phase in the "L" phases.

At step 372, the managing node announces a phase shift command to the plurality of member nodes to the subsequent phase. The subsequent key from the "L" keys encrypts communications in the network during the subsequent phase. At least one additional share for the subsequent key is required to resolve the subsequent key, relative to the first number of shares.

At step 374, the managing node broadcasts, to the member nodes, the second unique share belonging to the first member node. Broadcasting causes the first member node to have a duplicate of the second unique share. Remaining ones of the member nodes possess the second unique share plus a corresponding unique share belong to the remaining ones of the member nodes, such that the first member node cannot resolve the subsequent key, but the remaining ones of the plurality of member nodes can resolve the subsequent key. Note that broadcasting the second unique share removes the first member node from the member nodes in the subsequent phase because the first member node is unable to assemble the subsequent key in the subsequent phase.

Again, the method of FIG. 3E may be varied. For example, the method of FIG. 3E may also be performed with respect to the methods of FIG. 3B through FIG. 3D, or with other variations described with respect to FIG. 3A through FIG. 3D.

Attention is now turned to a more technical description of the one or more embodiments. Note that the nomenclature used with respect to this description does not match the nomenclature used with respect to the one or more embodiments described with respect to FIG. 1A through FIG. 3E. Thus, the following discussion is an alternative method of describing operation of the one or more embodiments.

A secret (i.e., the key) is defined as "k". The secret is divided into "n" shares. To reconstruct the secret, k, the knowledge of a threshold, "t" number of the shares out of n or greater, is required. Knowledge of less than t number of shares leaves the secret k undetermined. This (t, n) threshold scheme is a mathematically perfect secret sharing scheme, as it reveals nothing about k under insufficient knowledge circumstances.

Note that this example uses different notation than the examples given above. For example, this example refers to a (t, n) scheme. However, functionally, a (t, n) scheme is the same as a (k, n) scheme described with respect to FIG. 1B through FIG. 2B.

Attention is now turned to the multi-phase aspect of the secret sharing scheme. The managing node and network uses a communication protocol key rotation mechanism. A number of phases, "q", are established. Each q has its own distinct secret, k. Each k in q has a number of shares distributed among the nodes such that each member node has at least t shares. Among the t shares is a unique share, "s", that is assigned to an individual node.

Initially, the network membership is initialized using a pre-distribution of secret shares, including perhaps tunneled communication or other more expensive forms of communication. In other words, the managing node builds the initial key communication group securely per an established communication protocol. The managing node also establishes a list of secret keys, the corresponding share vectors for each group member node, and distributes them.

The managing node first defines a list of secret keys for each of the incremental L phases, defined as $\{k^1, k^2, \ldots k^j, \ldots, k^L\}$. Phases here are defined in terms of member node deletion. The managing node moves from one phase to the next only when deleting member(s)/node(s) from the network. Note that the systematic key refreshes regulated by the communication protocol's standard time-out mechanism are not part of, and are independent of, this incremental phase shift mechanism.

For each phase key $k^j$ (for phase j) in the list, the managing node uses an incremental multi-phase (j, n) secret sharing threshold scheme to construct shares for individual members nodes defined from 1 . . . m. Here, the term "j" is substituted for the term "t", because the value of the threshold used in each phase equals the value of the current phase.

For example: For a first phase key $k^1$, using a (1, n) threshold scheme, the unique share for the secret is divided as $s_1^{(1)}$, $s_2^{(1)}, \ldots, s_m^{(1)}$. For a second phase key, $k^2$, using a (2, n) threshold scheme, the unique share for the secret is defined as $s_1^{(2)}, s_2^{(2)}, \ldots, s_m^{(2)}$. For the $L^{th}$ phase key, $k^L$, using a (L, n) threshold scheme, the unique share for the secret is defined as $s_1^{(L)}, s_2^{(L)}, \ldots, s_m^{(L)}$.

Thus, each member node thus has a share vector, denoting secrets for each phase as follows: $\{s_1^{(1)}, s_1^{(2)}, \ldots, s_1^{(L)}\}$ for member/node 1 (for phase 1 through L), $\{s_2^{(1)}, s_2^{(2)}, \ldots, s_2^{(L)}\}$ for member node 2 (for phase 1 through L), and $\{s_m^{(1)}, s_m^{(2)}, \ldots, s_m^{(L)}\}$ for member node m (for phase 1 through L). The managing node uses an encrypted tunnel to securely distributes share vectors $\{s_i^{(1)}, s_i^{(2)}, \ldots, s_i^{(L)}\}$ to corresponding member node i.

After the initial establishment of the multi-phase threshold secret sharing network, new member nodes may join the network as follows. Assume that new member node, p, request to join the network in phase q. Upon successful authentication, the managing node constructs new share vector $\{s_p^{(q+1)}, s_p^{(q+2)}, \ldots, s_p^{(L)}\}$. The managing node distributes this share vector to node p through encrypted tunnel. The managing node also uses encrypted tunnel to securely distribute the current (phase q) network master key to member node, p. The member node p can now effectively communicate at phase q. The new member node also is in possession of secret shares for phase q+1, and beyond, and thus is ready for future phase shifts. Note that there is no phase shift during member/node joining.

Attention is now turned to an incremental threshold scheme (ITS), an example of which is described with respect to FIG. 3A and FIG. 3D. The methods of FIG. 3A and FIG. 3D integrate an ITS cryptographical function into the network's communication protocol's key rotation mechanism that allows for an effective and secure member node deletion a network that uses key encryption. The key management framework described herein alleviates frequent and expensive encrypted tunnel communication for network re-grouping operations.

The ITS procedure for node deletion may proceed as follows. First, as a definition, the managing node is to revoke a member node p during phase q. The managing node revokes p by moving the entire group of nodes (including the to-be-deleted node) to the next phase q+1, while preventing p from accessing the secret key for phase q+1, with the secret key being defined as, $k^{q+1}$.

Next, the managing node utilizes communication protocol's key-refresh mechanism to announce a phase-shift command. Assuming indices of previously deleted q−1 members nodes are defined as $d^1, d^2, \ldots, d^{q-1}$, the managing node also broadcasts $\{s_{d1}^{(q+1)}, s_{d2}^{(q+2)}, \ldots, s_{dq-1}^{(q+1)}\}$, and $s_p^{(q+1)}$ publicly, together with the following: 1: The q−1 broadcasted shares, 2, the also broadcasted $s_p^{(q+1)}$ share for the to-be-deleted p node, and the one share held by each remaining member node for phase q+1. Each valid member node now has q+1 independent shares and is capable of, upon the managing node's phase shift command, reconstructing $k^{q+1}$ based on a (q+1, n) threshold scheme.

A new group communication key is derived by applying a function f( ) on the phase key, the function being equal to $f(k^{q+1})$. With the new q+1 communication key, all valid remaining members nodes successfully shift into phase q+1. However, the to-be-deleted node, p, has only q distinctive shares (because its own share corresponding to phase q+1 was broadcasted). The q distinctive shares are insufficient to decode $k^{q+1}$. Therefore, node p is unable to communicate with the other member nodes of the network, and is therefore left behind or, stated differently, left out of the network. In effect, formerly member node p has been deleted from the network.

The following model may be used to formally describe the foundation of the above-described incremental secret sharing scheme with member node deletion. A group of m nodes members, denoted as $U=\{u_1, u_2, \ldots, u_m\}$. A set of L network-wide shared keys (also called network master keys), are denoted as $K=\{k^1, k^2, k^L\}$, where $k^j$ (j=1 . . . L represents phase index) is known only to the valid members at phase j. A set of m*L shares, S, constructed from an incremental secret sharing schemes, is denoted as $S=\{s_1^{(1)}, s_1^{(2)}, \ldots, s_1^{(L)}; s_2^{(1)}, s_2^{(2)}, \ldots, s_2^{(L)}; \ldots ; s_m^{(1)}, s_m^{(2)}, \ldots, s_m^{(L)}\}$; where $s_i^{(j)}$ (i=1, . . . , m representing node index) is a share constructed from an (j, n) (where n>m) incremental threshold scheme protecting secret key $k^j$ of phase j, and $s_i^{(j)}$ is assigned to node $u_i$. The multi-phase share vector pre-distributed to node $u_i$ for phase 1 through L is thus: $\{s_i^{(1)}, s_i^{(2)}, \ldots, s_i^{(L)}\}$.

A trusted managing node is denoted as T. A set of q−1 previously deleted members is defined as $D=\{u_{d1}, u_{d2}, \ldots u_{dq-1}\}$ where $d_j$ is the index of the node being revoked going in phase j+1, when one node is revoked at each phase.

The following table summarizes single member node deletion progression based on the model described above.

broadcasts shares for previously revoked q−1 member nodes, and also broadcasts shares for to be revoked r member nodes.

As a result, a total of q+r−1 shares become available from the broadcast. Adding their one non-broadcasted share to the broadcasted q+r−1 shares, the remaining valid members nodes have q+r shares, which are sufficient to reconstruct $k^{q+r}$. These members nodes use the new key to derive the phase q+r communication key and make a successful phase shift.

However, the rest of the to-be-deleted members nodes have only q+r−1 shares, as their own share was a part of the broadcasted q+r−1 shares. Without sufficient shares to decrypt $k^{q+r}$, they are dropped out of the q+r phase shift, and are thus deleted from the network.

Attention is now turned to another embodiment for deleting multiple member nodes concurrently (e.g., more than three nodes at a time) based on the procedure described with respect to Table 1, above. The multi-node deletion procedure may be termed a Gapped Incremental Threshold Scheme (GITS), which is different form the LITS procedure, described above. In this embodiment, as with the LITS embodiment, it is assumed that there are r>1 nodes to be revoked at phase q. An variation of the GITS procedure is described with respect to FIG. 3D.

In a highly dynamic, large-scale network, the possibility of revoking large number of members nodes at the same time (i.e., within the same phase) is high. Using ITS to revoke multiple nodes concurrently implies large number of pre-loaded shares being skipped or discarded. Thus, ITS may leads to a potential undesirable use of precious secure

TABLE 1

Incremental Threshold Scheme with Member Node Deletion

| | Phase 1 | Phase 2 | . . . Phase q | Phase q + 1 | Phase L |
|---|---|---|---|---|---|
| Incremental threshold scheme | (1, n) | (2, n) | . . . (q, n) | (q + 1, n) . . . | (L, n) |
| Secret key | $k^1$ | $k^2$ | $k^q$ | $k^{q+1}$ | $k^L$ |
| Share used by node $u_1$ for key reconstruction | $s_1^{(1)}$ | $s_1^{(2)}$ | $s_1^{(q)}$ | $s_1^{(q+1)}$ | $s_1^{(L)}$ |
| Share used by node $u_2$ | $s_2^{(1)}$ | $s_2^{(2)}$ | $s_2^{(q)}$ | $s_2^{(q+1)}$ | $s_2^{(L)}$ |
| Share used by node $u_i$ | $s_i^{(1)}$ | $s_i^{(2)}$ | $s_i^{(q)}$ | $s_i^{(q+1)}$ | $s_i^{(L)}$ |
| Share used by node $u_m$ | $s_m^{(1)}$ | $s_m^{(2)}$ | $s_m^{(q)}$ | $s_m^{(q+1)}$ | $s_m^{(L)}$ |
| To-be-deleted node index | $d_1$ | $d_2$ | $d_q$ | $d_{q+1}$ | None |
| broadcast message for transition into next phase | $\{s_{d1}^{(2)}\}$ | $\{s_{d1}^{(3)}, s_{d2}^{(3)}\}$ | $\{s_{d1}^{(q+1)}, s_{d2}^{(q+1)}, \ldots, s_{dq}^{(q+1)}\}$ | $\{s_{d1}^{(q+2)}, s_{d2}^{(q+2)}, \ldots, s_{dq+1}^{(q+2)}\}$ | None |

Attention is now turned to an alternative embodiment for concurrent multi-member nodes deletion. In this embodiment, it is assumed that there are r>1 nodes to be revoked at phase q. The concurrent deletion of multiple nodes may be referred to as a Leaped Incremental Threshold Scheme (LITS), and is based on table 1 above. A variation of the LITS procedure is shown in FIG. 3C.

To delete r nodes in phase q, the managing node, T, advances to the (q+r, n) threshold scheme phase originally used for phase q+r by skipping r phases. In this case, T storage on local member nodes, as well as secure transmission bandwidth between managing node and members nodes. To improve upon the storage and communication efficiency, GITS may be used to delete many nodes concurrently from a dynamic, large-scale network.

In GITS, instead of increasing by 1 for j in the incremental (j, n) scheme, the threshold j advances by more than 1 between phases. The managing node constructs member nodes' share vectors using a gap, a. The construction of share vectors is defined as follows:

TABLE 2

Share Vector Construction for GITS

| | Phase 1 | Phase 2 | ... Phase q | Phase 7 + 1 ... | ... Phase L |
|---|---|---|---|---|---|
| Gap Incremental Threshold scheme | (1, n) | (a + 1, n) | ... ((q − 1)*a + 1, n) | (q*a + 1, n) | ... ((L − 1)*a + 1, n) |

Thus, for example, defining a=3 leads to (1, n) (4, n) (7, n) (10, n) ... , ((L−1)*3+1, n) threshold scheme. However, a=5 leads to (1, n) (6, n) (11, n) (16, n) ... , ((L−1)*3+1, n) threshold scheme. In turn, a=7 leads to (1, n) (8, n) (15, n) (22, n) ... , ((L−1)*3+1, n) threshold scheme.

The inter-phase gaps within the scheme are used by the managing node to later "fill-in" for the purpose of achieving simultaneous multiple member node deletion. This GITS process is described as follows.

Assuming the total number of previously revoked members nodes, up to phase q is defined as "b", and further assuming that the managing node is set to revoke r nodes, then two cases are presented. For case 1, it is assumed that b+r<=q*a. For case 2, it is assumed that b+r>q*a.

For case 1, there are a sufficient number of gaps prior to and including phase q to cover concurrent deletion of r nodes. The managing node, T, will bring the remaining group member nodes into phase q+1. T publicly broadcasts phase q+1 shares for all the previously revoked b nodes and those of to-be-revoked r nodes. T further calculates and broadcasts additional "gap-filling," q*a−r−b, shares based on the destined (q*a+1, n) threshold scheme that protects $k^{q+1}$.

All valid members nodes now have their own one private, phase q+1 share. All valid member nodes also have the broadcasted b+r shares, as well as the gap-filling q*a−r−b shares.

A total of 1+b+r+q*a−r−b=q*a+1 number of q+1 phase shares thus is sufficient to reconstruct $k^{q+1}$. Valid member nodes then use $k^{q+1}$ to calculate the new symmetric group communication key and make the shift into phase q+1.

Other to-be-deleted member nodes have only a number of broadcast shares equal to b+r+q*a−r−b=q*a, as their own q+1 phase share was already broadcasted. Such a number of share sis insufficient to reconstruct $k^{q+1}$. Thus, the multiple member nodes that are to be deleted fail to make the phase shift, and are effectively deleted from the network.

Attention is now turned to case 2, in which b+r>q*a. The gaps prior to phase q are insufficient to cover the concurrent deletion of r nodes. In this case, the managing node will shift the group into a new phase defined by a threshold scheme defined for $$(\left\lceil \frac{r+b}{a} \right\rceil * a + 1, n),$$

where the term $$\left\lceil \frac{r+b}{a} \right\rceil$$

is defined as the ceiling function.

The managing node, T, then broadcasts the shares for all the previously and currently revoked b+r nodes corresponding to the $$\left\lceil \frac{r+b}{a} \right\rceil + 1 \text{ phase.}$$

T calculates and broadcasts additional "gap-filling" shares defined by the ceiling function. Namely, T calculates and broadcasts a number of ceiling shares equal to $$\left\lceil \frac{r+b}{a} \right\rceil * a - b - r,$$

based on the $$(\left\lceil \frac{r+b}{a} \right\rceil * a + 1, n)$$

threshold scheme.

As with case 1, T broadcasts one less share than the threshold. The fact that the shares for all the deleted members are included in the broadcast forces the to-be-deleted member nodes to have one less share than the new threshold requires. Thus, the to-be-deleted member nodes are unable to reconstruct the new phase key, and are effectively deleted from the network.

At the same time, all remaining valid member nodes can combine the one unique share it owns privately with the broadcasted shares to reconstruct the new secret key. Accordingly, remaining valid member nodes may continue to communicate with successfully during the subsequent phase transition.

The GITS procedure has several useful features. The GITS procedure is able to revoke significantly larger number of member nodes at any given single phase, depending on the gap, a, relative to ITS or LITS. Additionally, using GITS, the storage efficiency of the member nodes is higher. To support the same deletion number, GITS member nodes can carry smaller size share vectors. Smaller size share vectors are possible with GITS because, with the same share vector size (L), LITS can support up to L−1 deletion, while GITS, with the built-in gaps (a), can support up to (L−1)*a member node deletions.

Nevertheless, the LITS and the ITS procedure have their own desirable features, especially with smaller networks and/or networks that are relatively stable (i.e., there are relatively few member node deletions and additions relative to a large and dynamic network). In particular, LITS and ITS may be more computationally efficient for such network types. Thus, the selection of ITS, LIT, or GITS depends on the particular implementation, and none of the different embodiments is necessarily better or worse than the other.

All three member node deletion schemes have significantly favorable features relative to existing member node deletion schemes. For example, group communication messages for node deletion are all broadcasted where no encryption or decryption takes place. The computation cost for the one or more embodiments is low for the managing node, as well as for the member nodes.

In addition, unlike a hierarchical key encryption key scheme, the one or more embodiments impose little or no computation overhead to the managing node maintaining the hierarchical key tree structure for member node joining and deletion. Additionally, little or no management overhead is associated for individual nodes to keep track of which subgroup key to use to decrypt new keys in different phases. The information in the broadcast messages of the one or more embodiments are used by the remaining nodes equally.

Yet further, since secret share vectors were already pre-distributed during group initialization, the one or more embodiments have no need to deliver secret keys during deletion. Therefore, the one or more embodiments can leverage the built-in key rotation mechanism of the managing node's protocols to publicly deliver deletion phase shift signals and broadcast shares. Since the key rotation mechanisms are typically native protocol constructs that run at a lower open system interconnection (OSI) layer (e.g., media access control (MAC) layer, data link layer, etc.), the one or more embodiments are much more efficient in terms of performance and communication resource requirement, relative to those running at the higher OSI layers (e.g., transmission control protocol (TCP) layer, transport layer, etc.) with full-fledged encrypted tunnels between managing node and member nodes. Because the one or more embodiments avoid expensive tunnels, especially for large groups, the one or more embodiments incur lower communication costs for both the managing node and the members nodes, relative to the use of tunnels.

Note that still other variations of the one or more embodiments are possible. For example, the network may be a mobile ad-hoc network (MANET). In this case, the member nodes may be mobile computing devices, and the methods therefore may be characterized as deleting one or more of the mobile computing devices. Similarly, the network may be an Internet of Things (IoT) network, and the member nodes may be network capable devices. Thus, "things" (i.e. of the "Internet of Things") that are connected to the network via network devices attached to the "things" may be deleted from the network.

While the various steps in this flowchart are presented and described sequentially, one of ordinary skill will appreciate that some or all of the steps may be executed in different orders, may be combined or omitted, and some or all of the steps may be executed in parallel. Furthermore, the steps may be performed actively or passively. For example, some steps may be performed using polling or be interrupt driven in accordance with one or more embodiments of the invention. By way of an example, determination steps may not require a processor to process an instruction unless an interrupt is received to signify that condition exists in accordance with one or more embodiments of the invention. As another example, determination steps may be performed by performing a test, such as checking a data value to test whether the value is consistent with the tested condition in accordance with one or more embodiments of the invention.

Figure 4:
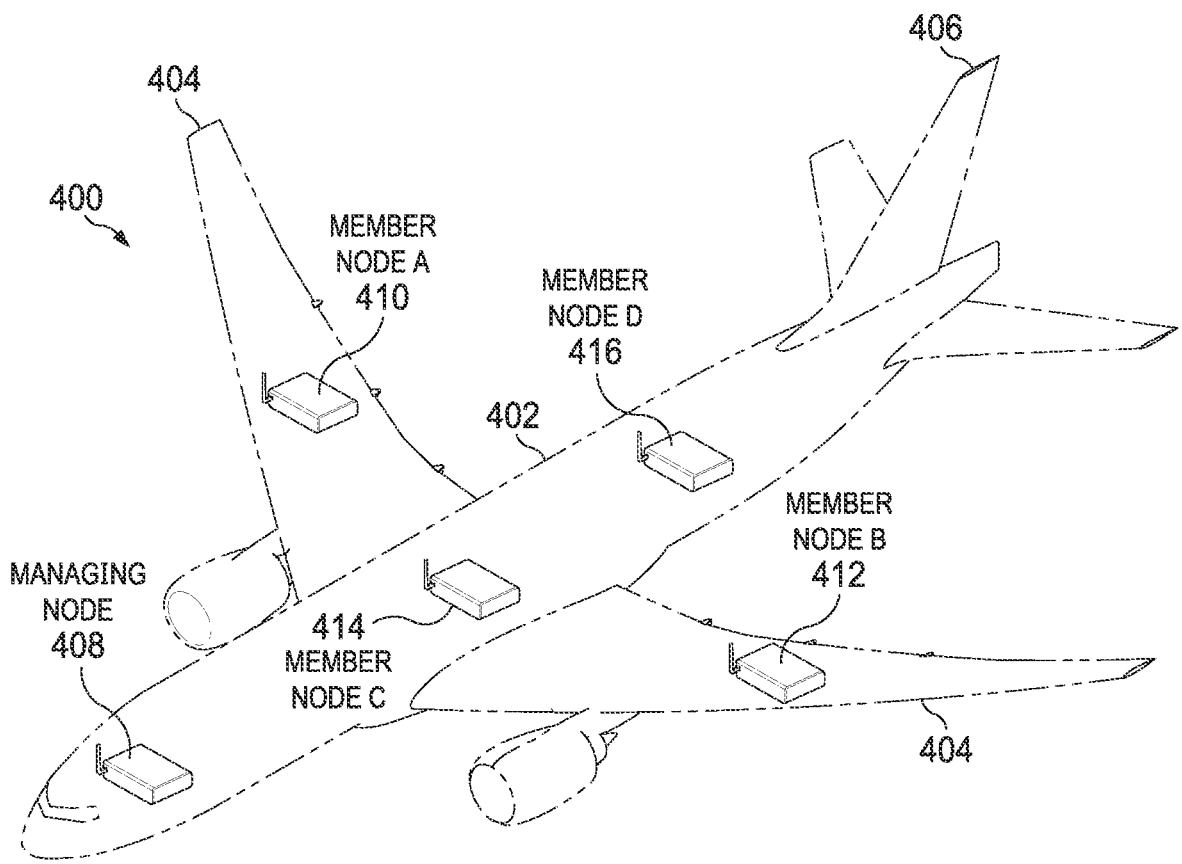
FIG. 4 shows an aerospace body having a network of nodes, in accordance with one or more embodiments of the invention.

FIG. 4 shows an aerospace body having a network of nodes, in accordance with one or more embodiments of the invention. The aerospace body (400) shown in FIG. 4 is a specific example of one of the many possible uses of the one or more embodiments described with respect to FIG. 1A through FIG. 3D. Thus, the example shown in FIG. 4 should not be considered a limitation on the other embodiments described herein.

The aerospace body (400) may be that of any aerospace vehicle, such as but not limited to an airplane, a glider, a helicopter, a balloon, a rocket, etc. However, as an example, the aerospace body (400) shown in FIG. 4 is an airplane including a fuselage (402), wings (404), and a tail (406), and a propulsion system (not shown). The aerospace body (400) includes a variety of network capable devices that perform various functions.

In the example of FIG. 4, a managing node (408) is located in the nose and/or cockpit of the aerospace body (400). A variety of different member nodes are also included that form a network, together with the managing node (408). In particular, four member nodes are disposed in or on the aerospace body (400): member node A (410), member node B (412), member node C (414), and member node D (416).

In this example, member node A (410) and member node B (412) are connected in or on the wings (404). The two member nodes, member node A (410) and member node B (412), may collect flight information about the aerospace body (400). From time to time, the member node A (410) and/or the member node B (412) may be replaced due to regular maintenance. When the existing member nodes are removed, one of the procedures described with respect to FIG. 3A, FIG. 3C, and FIG. 3D may be used to remove the respective member node from the network. The replacement nodes may then be joined according to the method described with respect to FIG. 3B.

The member node A (410) and the member node B (412) may also be considered to belong to a sub-group which is pre-defined as being stable. In other words, the member node A (410) and the member node B (412) are replaced relatively infrequently. Thus, ITS may be used to delete the member node A (410) and/or the member node B (412) from the network.

Also in this example, the aerospace body (400) carries a number of cargo units. Each cargo unit is associated with (i.e. physically connected to, assigned to a particular wireless device, etc.) a member node. In the example of FIG. 4, member node C (414) and member node D (416) are nodes associated with cargo units. The cargo units are added and removed from the aerospace body (400) frequently, and thus form their own sub-group of member nodes within the network managed by the managing node (408). As cargo is removed from the aircraft, member node C (414) and/or member node D (416) may be deleted from the network via the one or more embodiments described above. As cargo is added to the aircraft, additional member nodes may be joined to the network managed by the managing node (408).

Many more member nodes may be associated with many cargo units. Thus, a large and dynamic network of member nodes may be associated with the aerospace body (400). Thus, LITS or GITS, described with respect to FIG. 3C or FIG. 3D, may be used to delete nodes from the sub-group of nodes associated with member node C (414) and member node D (416). Alternatively, LITS or GITS may be used to manage all nodes managed by the managing node (408) with respect to the aerospace body (400).

Thus, the one or more embodiments, in a specific embodiment, may be characterized as an aerospace body. The term "aerospace body" is defined as the structural components that form an aerospace vehicle. For example, some aerospace bodies may include wings (e.g. an airplane), but others (e.g. a helicopter) may not. However, both wings and helicopter blades may be considered parts of an aerospace body. Other features such as propulsion systems, fuselages, tails, flaps, ailerons, etc. may also be considered parts of an aerospace body, such as the aerospace body (400) shown in FIG. 4.

The aerospace body (400) may be connected to a managing node (408). In the context of this example "connected to" means physically connected outside the aerospace body (400), inside the aerospace body (400), or within some other component of the aerospace body (400). The aerospace body (400) is connected, either in a wired manner or a wireless manner (or a combination thereof) to the member nodes, member node A (410), member node B (412), member node C (414), and member node D (416). Thus, for example, the managing node (408) may be "connected to" the aerospace body (400) when the managing node (408) is a mobile device that is moved with the cargo units that are associated with the member nodes, because the managing node (408) is "within" the aerospace body (400).

The managing node (408) may be characterized as a first hardware device configured to create and maintain a list of "L" keys, corresponding to "L" phases of a multi-phase threshold secret sharing scheme established by the managing node (408). The managing node (408), as described above, may manage addition and deletion of member nodes from the network according to the procedures described above with respect to FIG. 1B through FIG. 3D.

In the example of cargo units above, at least some of the member nodes are tracking devices disposed on or within at least some of the cargo units. Because the managing node (408) manages addition and deletion of member nodes, the managing node (408) is further configured to track addition or removal of ones of the cargo units from the aerospace body (400) by adding and deleting ones of the member nodes from the network.

The above example is for explanatory purposes only and not intended to limit the scope of the other embodiments described herein. Thus, many other variations and examples are possible.

Figure 5A:
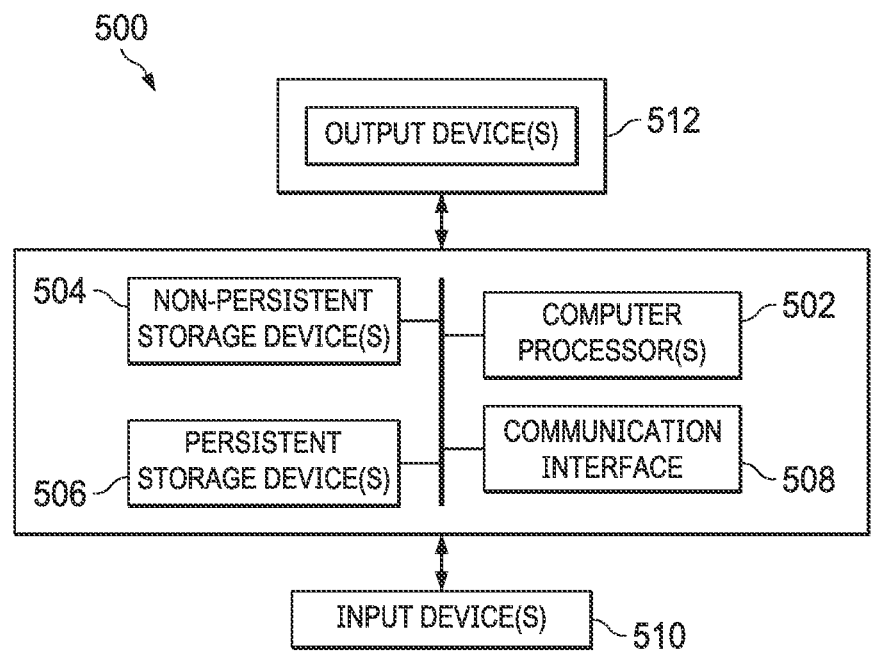
FIG. 5A shows a computing system, in accordance with one or more embodiments of the invention.
Figure 5B:
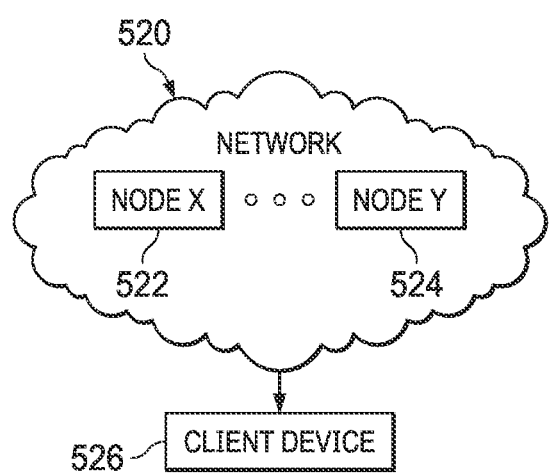
FIG. 5B shows a network system, in accordance with one or more embodiments of the invention.

FIG. 5A and FIG. 5B are examples of a computing system and a network, in accordance with one or more embodiments of the invention. Embodiments of the invention may be implemented on a computing system specifically designed to achieve an improved technological result. When implemented in a computing system, the features and elements of the disclosure provide a significant technological advancement over computing systems that do not implement the features and elements of the disclosure. Any combination of mobile, desktop, server, router, switch, embedded device, or other types of hardware may be improved by including the features and elements described in the disclosure. For example, as shown in FIG. 5A, the computing system (500) may include one or more computer processors (502), non-persistent storage device(s) (504) (e.g., volatile memory, such as random access memory (RAM), cache memory), persistent storage device(s) (506) (e.g., a hard disk, an optical drive such as a compact disk (CD) drive or digital versatile disk (DVD) drive, a flash memory, etc.), a communication interface (508) (e.g., Bluetooth interface, infrared interface, network interface, optical interface, etc.), and numerous other elements and functionalities that implement the features and elements of the disclosure.

The computer processor(s) (502) may be an integrated circuit for processing instructions. For example, the computer processor(s) may be one or more cores or micro-cores of a processor. The computing system (500) may also include one or more input devices (510), such as a touchscreen, keyboard, mouse, microphone, touchpad, electronic pen, or any other type of input device.

The communication interface (508) may include an integrated circuit for connecting the computing system (500) to a network (not shown) (e.g., a local area network (LAN), a wide area network (WAN) such as the Internet, mobile network, or any other type of network) and/or to another device, such as another computing device.

Further, the computing system (500) may include one or more output devices (512), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage device(s) (504), and persistent storage device(s) (506). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

The computing system (500) in FIG. 5A may be connected to or be a part of a network. For example, as shown in FIG. 5B, the network (520) may include multiple nodes (e.g., node X (522), node Y (524)). Each node may correspond to a computing system, such as the computing system shown in FIG. 5A, or a group of nodes combined may correspond to the computing system shown in FIG. 5A. By way of an example, embodiments of the invention may be implemented on a node of a distributed system that is connected to other nodes. By way of another example, embodiments of the invention may be implemented on a distributed computing system having multiple nodes, where each portion of the invention may be located on a different node within the distributed computing system. Further, one or more elements of the aforementioned computing system (500) may be located at a remote location and connected to the other elements over a network.

Although not shown in FIG. 5B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (522), node Y (524)) in the network (520) may be configured to provide services for a client device (526). For example, the nodes may be part of a cloud computing system. The nodes may include functionality to receive requests from the client device (526) and transmit responses to the client device (526). The client device (526) may be a computing system, such as the computing system shown in FIG. 5A. Further, the client device (526) may include and/or perform all or a portion of one or more embodiments of the invention.

The computing system or group of computing systems described in FIGS. 5A and 5B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the invention. The processes may be part of the same or different application and may execute on the same or different computing system.

Rather than or in addition to sharing data between processes, the computing system performing one or more embodiments of the invention may include functionality to receive data from a user. For example, in one or more embodiments, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system, in performing one or more embodiments of the invention, may extract one or more data items from the obtained data. For example, the extraction may be performed as follows by the computing system in FIG. 5A. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail-such as in nested packet headers or nested document sections). Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query presented to a structured data repository (where the data repository may be organized according to a database schema or data format, such as XML).

The extracted data may be used for further processing by the computing system. For example, the computing system of FIG. 5A, while performing one or more embodiments of the invention, may perform data comparison. Data comparison may be used to compare two or more data values (e.g., A, B). For example, one or more embodiments may determine whether A>B, A=B, A!=B, A<B, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if A>B, B may be subtracted from A (i.e., A−B), and the status flags may be read to determine if the result is positive (i.e., if A>B, then A−B>0). In one or more embodiments, B may be considered a threshold, and A is deemed to satisfy the threshold if A=B or if A>B, as determined using the ALU. In one or more embodiments of the invention, A and B may be vectors, and comparing A with B requires comparing the first element of vector A with the first element of vector B, the second element of vector A with the second element of vector B, etc. In one or more embodiments, if A and B are strings, the binary values of the strings may be compared.

The computing system in FIG. 5A may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, data containers (database, table, record, column, view, etc.), identifiers, conditions (comparison operators), functions (e.g. join, full join, count, average, etc.), sorts (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system of FIG. 5A may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The above description of functions presents only a few examples of functions performed by the computing system of FIG. 5A and the nodes and/or client device in FIG. 5B. Other functions may be performed using one or more embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method comprising:
securing, by a managing node, communication in a network of a plurality of member nodes including a first member node, wherein communication is secured using a ($k$, $n_1$) secret sharing scheme during a first phase, "k" is a first threshold of shares required to resolve a first key used in the first phase, and "$n_1$" is a first total number of shares for the first key;
announcing, by the managing node, a phase shift to a subsequent phase relative to the first phase;
securing, by the managing node, communication in the network during the subsequent phase using a ($k+x$, $n_2$) secret sharing scheme wherein:
"x" is at least 1, and $k+x$ is a second threshold of shares required to resolve a second key used in the subsequent phase,
"$n_2$" is a second total number of shares for the second key, each of the plurality of member nodes is previously in possession of exactly one corresponding unique share for the second key, and the first member node is previously in possession of a first unique share for the second key; and deleting, by the managing node, the first member node from the subsequent phase by broadcasting the first unique share for the second key and, if previously deleted nodes were previously deleted from the network, also broadcasting additional unique shares for the second key belonging to all previously deleted nodes.

2. The method of claim 1, wherein, after broadcasting:

the first member node has a duplicate copy of the first unique share for the second key, such that the first member node has (k+x)−1 shares for the second key and cannot resolve the second key, remaining ones of the plurality of member nodes have k+x shares for the second key, being the exactly one corresponding unique share for the second key plus the first unique share for the second key that was broadcast, and wherein the remaining ones of the plurality of member nodes can resolve the second key.

3. The method of claim 1, wherein the previously deleted nodes were previously deleted, and wherein the managing node further broadcasts the additional unique shares for the second key belonging to all previously deleted nodes.

4. The method of claim 1, wherein $n_1$ has a first value equivalent to a second value of $n_2$.

5. The method of claim 1, further comprising:

receiving, by the managing node, a request to delete the first member node of the plurality of member nodes from the network.

6. The method of claim 1, further comprising:

receiving, at the managing node, a request to add a new member node to the plurality of member nodes;

authenticating, by the managing node, the new member node;

constructing, by the managing node, a new share vector comprising a set of shares comprising corresponding unique shares for a plurality of keys in future phases; and distributing, by the managing node, the new share vector to the plurality of member nodes and the new member node.

7. The method of claim 1, wherein "x" is greater than one.

8. The method of claim 1, further comprising:

receiving, at the managing node, a request to remove a second member node from the plurality of member nodes, the request to remove the second member node to be performed concurrently with the request to delete the first member node, wherein the second member node has a second unique share for the second key, wherein the subsequent phase announced comprises at least two phases past a current phase for the network, wherein x is equal to a number of phases that the subsequent phase is past the current phase, and wherein broadcasting further comprises broadcasting the second unique share.

9. The method of claim 1, further comprising:

receiving, at the managing node, a request to remove a plurality of additional member nodes from the plurality of member nodes, wherein the request to remove the plurality of additional member nodes is to be performed concurrently with the request to delete the first member node;

broadcasting, by the managing node, shares for the second key, for the subsequent phase, of the plurality of additional member nodes; and broadcasting, by the managing node to the plurality of member nodes, a plurality of gap-filling shares for the second key.

10. The method of claim 9, wherein the subsequent phase is defined by a ceiling function, and wherein the method further comprises:

calculating, by the managing node, the ceiling function, and wherein broadcasting the plurality of gap-filling shares for the second key comprises broadcasting a number of gap-filing shares equal to the ceiling function.

11. The method of claim 1, wherein the network comprises an Internet of Things (IOT) network, and wherein the plurality of member nodes comprise tracking devices, network capable machines, and combinations thereof.

12. The method of claim 1, wherein the network comprises a Mobile Ad hoc Network (MANET), and wherein the plurality of member nodes comprise at least two devices selected from the group consisting of mobile phones, tablet computers, laptop computers, and special purpose computers.

13. The method of claim 1, wherein the plurality of member nodes comprise network capable devices that are attached to a plurality of cargo units, and wherein the method further comprises:

tracking the plurality of cargo units using the plurality of member nodes.

14. The method of claim 13, wherein tracking further comprises:

adding a cargo unit to a list of the plurality of cargo units when a new network capable device, attached to a new cargo unit, is added to the plurality of member nodes.

15. The method of claim 13, wherein tracking further comprises:

deleting a cargo unit from a list of the plurality of cargo units when the first member node is deleted from the network, wherein the first member node comprises one of the network capable devices.

16. The method of claim 13, further comprising:

attaching the network capable devices to the plurality of cargo units.

17. The method of claim 13, wherein the managing node comprises a hardware network device of a vehicle, and wherein the plurality of cargo units comprise cargo units on board the vehicle.

18. The method of claim 14, wherein the new network capable device is added to the plurality of member nodes by:

receiving, at the managing node, a request to add the new network capable device to the plurality of member nodes;

authenticating, by the managing node, the new network capable device;

constructing, by the managing node, a new share vector comprising a set of shares comprising corresponding unique shares for a plurality of keys in future phases; and distributing, by the managing node, the new share vector to the plurality of member nodes and the new network capable device.

19. The method of claim 1, wherein shares of the $(k, n_1)$ secret sharing scheme are portions of neither the first key nor the second key.

20. The method of claim 1, further comprising:
deleting, concurrently, multiple additional ones of the plurality of member nodes using one of a gapped incremental threshold scheme (GITS) and a leaping incremental threshold scheme (LITS).

* * * * *